US011897268B2

(12) United States Patent
Igarashi

(10) Patent No.: US 11,897,268 B2
(45) Date of Patent: Feb. 13, 2024

(54) INK-JET PRINTER

(71) Applicant: BROTHER KOGYO KABUSHIKI KAISHA, Nagoya (JP)

(72) Inventor: Akinori Igarashi, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/503,839

(22) Filed: Oct. 18, 2021

(65) Prior Publication Data

US 2022/0032637 A1 Feb. 3, 2022

Related U.S. Application Data

(63) Continuation of application No. 16/819,227, filed on Mar. 16, 2020, now Pat. No. 11,148,430, which is a (Continued)

(30) Foreign Application Priority Data

Oct. 31, 2014 (JP) ................................ 2014-222272

(51) Int. Cl.
*B41J 2/17* (2006.01)
*B41J 2/175* (2006.01)
*B41J 29/13* (2006.01)

(52) U.S. Cl.
CPC ........... *B41J 2/17553* (2013.01); *B41J 2/175* (2013.01); *B41J 2/1752* (2013.01); (Continued)

(58) Field of Classification Search
None
See application file for complete search history.

(56) References Cited

U.S. PATENT DOCUMENTS 6,003,986 A 12/1999 Keefe
2004/0233259 A1 11/2004 Amma et al.
(Continued)

FOREIGN PATENT DOCUMENTS

EP 1 772 277 A2 4/2007
JP 2012-051306 A 3/2012
(Continued)

OTHER PUBLICATIONS

Office Action issued in related Chinese Patent Application No. 201910106871.4, dated Apr. 26, 2020.
(Continued)

*Primary Examiner* — Erica S Lin
(74) *Attorney, Agent, or Firm* — Merchant & Gould P.C.

(57) ABSTRACT

There is provided a liquid consuming apparatus including a casing, a liquid consuming section, and a tank. The tank includes a box-shaped body having a light-transmitting property and having five walls and a partition wall; a film adhered to rear end portions of the walls; and a positioning section disposed at least on an outer surface of each of the upper and lower walls, or of each of the right and left walls. In a state that the liquid consuming apparatus is placed on a horizontal plane, the box-shaped body is positioned at a posture at which the positioning section is brought into contact with the casing to thereby allow the front wall to be exposed from a side surface of the casing which extends in a direction crossing the horizontal plane, and at which the rear end portions are located inside the casing.

24 Claims, 16 Drawing Sheets

Related U.S. Application Data continuation of application No. 15/924,694, filed on Mar. 19, 2018, now Pat. No. 10,589,533, which is a continuation of application No. 15/259,321, filed on Sep. 8, 2016, now Pat. No. 9,919,535, which is a continuation of application No. 14/744,566, filed on Jun. 19, 2015, now Pat. No. 9,440,445.

(52) U.S. Cl.
CPC ....... *B41J 2/17509* (2013.01); *B41J 2/17513* (2013.01); *B41J 29/13* (2013.01)

(56) References Cited

U.S. PATENT DOCUMENTS

| | | | | |
|---|---|---|---|---|
| 2005/0046657 | A1 | 3/2005 | Seki et al. | |
| 2007/0242112 | A1 | 10/2007 | Yazawa | |
| 2008/0231676 | A1* | 9/2008 | Shimizu | B41J 2/17513 347/86 |
| 2009/0295885 | A1 | 12/2009 | Wanibe | |
| 2009/0322836 | A1* | 12/2009 | Kanbe | B41J 2/17513 347/86 |
| 2012/0056938 | A1 | 3/2012 | Ishizawa et al. | |
| 2012/0081422 | A1 | 4/2012 | Kura | |
| 2014/0104349 | A1 | 4/2014 | Kimura et al. | |
| 2014/0247310 | A1 | 9/2014 | Ishizawa et al. | |
| 2015/0367648 | A1 | 12/2015 | Kimura et al. | |
| 2016/0009100 | A1 | 1/2016 | Kudo et al. | |
| 2016/0016409 | A1 | 1/2016 | Kimura et al. | |

FOREIGN PATENT DOCUMENTS

| | | | |
|---|---|---|---|
| JP | 2014-079908 | A | 5/2014 |
| WO | 2014/115506 | A1 | 7/2014 |
| WO | 2014/132634 | A1 | 9/2014 |
| WO | 2014/132635 | A1 | 9/2014 |

OTHER PUBLICATIONS

Office Action issued in parent U.S. Appl. No. 16/819,227, dated Jan. 25, 2021.

Notice of Allowance issued in parent U.S. Appl. No. 16/819,227, dated Jun. 21, 2021.

* cited by examiner 14
14A
80
(80A)
(80B)
81
82
83
87
89
93
94
100
101
101A
101B
104
105
106
111C
111M
112
7
8
UP
DOWN
FRONT
REAR

INK-JET PRINTER

CROSS REFERENCE TO RELATED APPLICATION

The present application is a continuation of U.S. patent application Ser. No. 16/819,227, filed Mar. 16, 2021, now U.S. Pat No. 11,148,430, which is a continuation of U.S. patent application Ser. No. 15/924,694, filed Mar. 19, 2018, now U.S. Pat. No. 10,589,533, which is a continuation of U.S. patent application Ser. No. 15/259,321, filed Sep. 8, 2016, now U.S. Pat. No. 9,919,535 which is a continuation of U.S. patent application Ser. No. 14/744,566, filed Jun. 19, 2015, now U.S. Pat. No. 9,440,445, which further claims priority from Japanese Patent Application No. 2014-222272 filed on Oct. 31, 2014 the disclosure of all which are incorporated herein by reference in their entirety.

BACKGROUND

Field of the Invention

The present invention relates to a liquid consuming apparatus including a casing, a liquid consuming section arranged inside the casing, a tank arranged inside the casing and configured to store a liquid to be supplied to the liquid consuming section.

Description of the Related Art

Conventionally, there is known a printer (an example of a liquid consuming system) having a tank which is refillable with an ink, and a recording head configured to discharge, from nozzles, the ink supplied from the tank onto a recording paper to thereby record an image on the recording paper. In a case that a liquid such as the ink inside the tank is consumed, the liquid stored in a bottle can be supplied inside the tank via an inlet (inlet port) so as to replenish or refill the tank with the liquid.

SUMMARY

In a printer configured to perform recording an image, etc. by using a plurality of color inks, the inks of different colors need to be stored in a plurality of mutually independent spaces, respectively. Accordingly, such a printer is provided with a plurality of tanks corresponding to the inks of different colors, respectively; these tanks are connected as an integrated part or component.

Further, in a case that the tank is produced as a molded part or item made of a synthetic resin, it is difficult to mold a space capable of storing the ink. Accordingly, at least a portion of the outer wall of the tank is molded to have a shape with an opening, and a film is adhered to the opening to define or demarcate the space capable of storing the ink therein. In the tank having such a shape, the surface to which the film is adhered has a weaker strength than the remaining portion of the outer wall made of the synthetic resin, and is easily broken or ruptured due to any external force. Therefore, the surface, in the tank, to which the film is adhered preferably prevented from being touched by a user in a general usage of the printer.

The present teaching has been made in view of the above-described circumstances; an object of the present teaching is, for example, to provide a means for defining a plurality of spaces capable of storing independently a plurality of liquid of different colors, respectively, with an integrated molded item and a film.

Another object of the present teaching is to provide a mechanism configured to position a tank inside a casing such that a surface, of the tank, to which a film is adhered is hardly touched or accessed by the user.

According to an aspect of the present teaching, there is provided a liquid consuming apparatus configured to consume a liquid, the apparatus including:

a casing;

a liquid consuming section arranged in the casing and configured to consume the liquid;

a tank arranged in the casing and configured to store a liquid which is to be supplied to the liquid consuming section, the tank having: a box-shaped body having a front wall, an upper wall, a lower wall, a right wall, a left wall and a partition wall dividing a space defined by the front, upper, lower, right and left walls into a plurality of spaces arranged in a left-right direction, the box-shaped body being formed of a resin having a light-transmitting property; a film adhered to rear end portions of the front, upper, lower, right, left and partition walls; and a positioning section disposed at least on an outer surface of each of the upper and lower walls, or on an outer surface of each of the right and left walls, wherein in a state that the liquid consuming apparatus is placed on a horizontal plane, the box-shaped body is positioned at a posture at which the positioning section is brought into contact with the casing to thereby allow the front wall to be exposed from a side surface of the casing which extends in a direction crossing the horizontal plane, and at which the rear end portions of the front, upper, lower, right, left and partition walls are located inside the casing.

Since the front wall of the box-shaped body is exposable from the side surface of the casing and the box-shaped body is formed of the resin having light-transmitting property, it is possible to visually confirm or observe a liquid remaining amount of the liquid inside the tank through the front wall of the box-shaped body. Further, the box-shaped body having the plurality of spaces divided by the partition wall can be formed as an integrated molded item made of resin. Furthermore, since the tank is positioned to assume the posture at which the front wall of the box-shaped body is exposable from the side surface of the casing and at which the rear end portion(s) of the box-shaped body is (are) located inside the casing in a state that the liquid consuming apparatus is placed on a horizontal plane, the film adhered to the rear end portion(s) of the box-shaped body can be hardly accessed or is difficult to be accessed by an user.

According to the present teaching, it is possible to define, for example, a plurality of spaces which are capable of storing a plurality of liquids having different colors independently from each other, with the box-shaped body as the integrated molded item and the film.

Further, it is possible to position the tank inside the casing in such a manner that the surface to which the film is adhered is unlikely to be touched by the user.

BRIEF DESCRIPTION OF THE DRAWINGS

FIG. 1A and FIG. 1B are external perspective views of a multi-function peripheral 10, wherein FIG. 1A depicts a state that a cover 70 is at a close position, and FIG. 1B depicts a state that the cover 70 is at an open position.

FIGS. 13A and 13B are each a view depicting the front right lower portion of the casing 14 and the ink tank 100, wherein FIG. 13A is a front view, and FIG. 13B is a right side view.

DESCRIPTION OF THE EMBODIMENTS

Figure 1A:
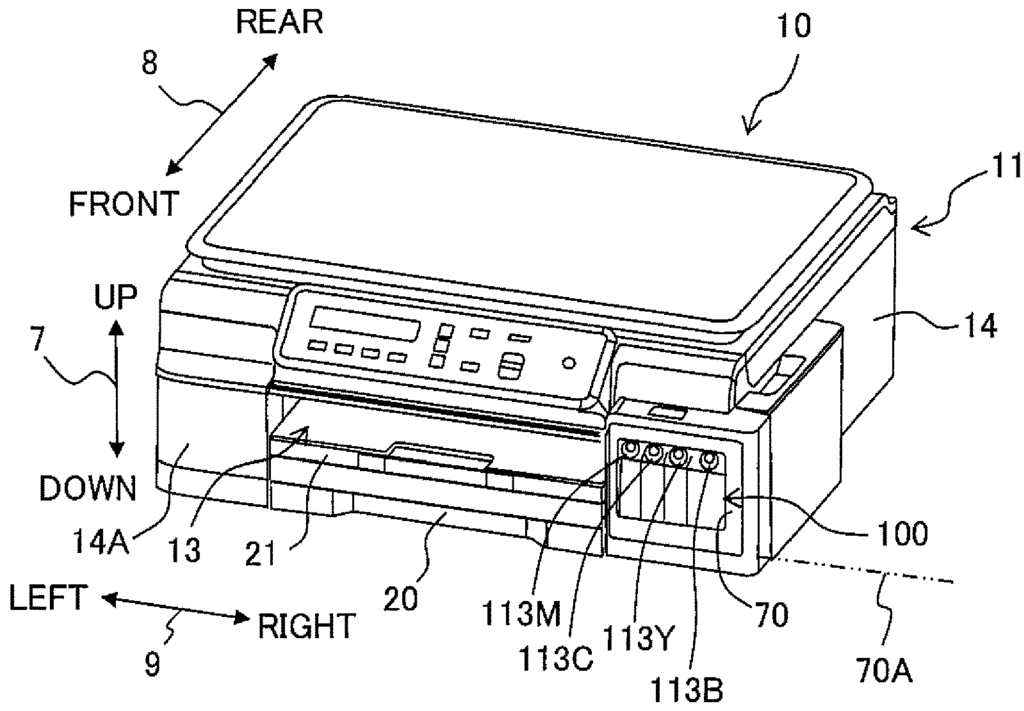
Figure 1B:
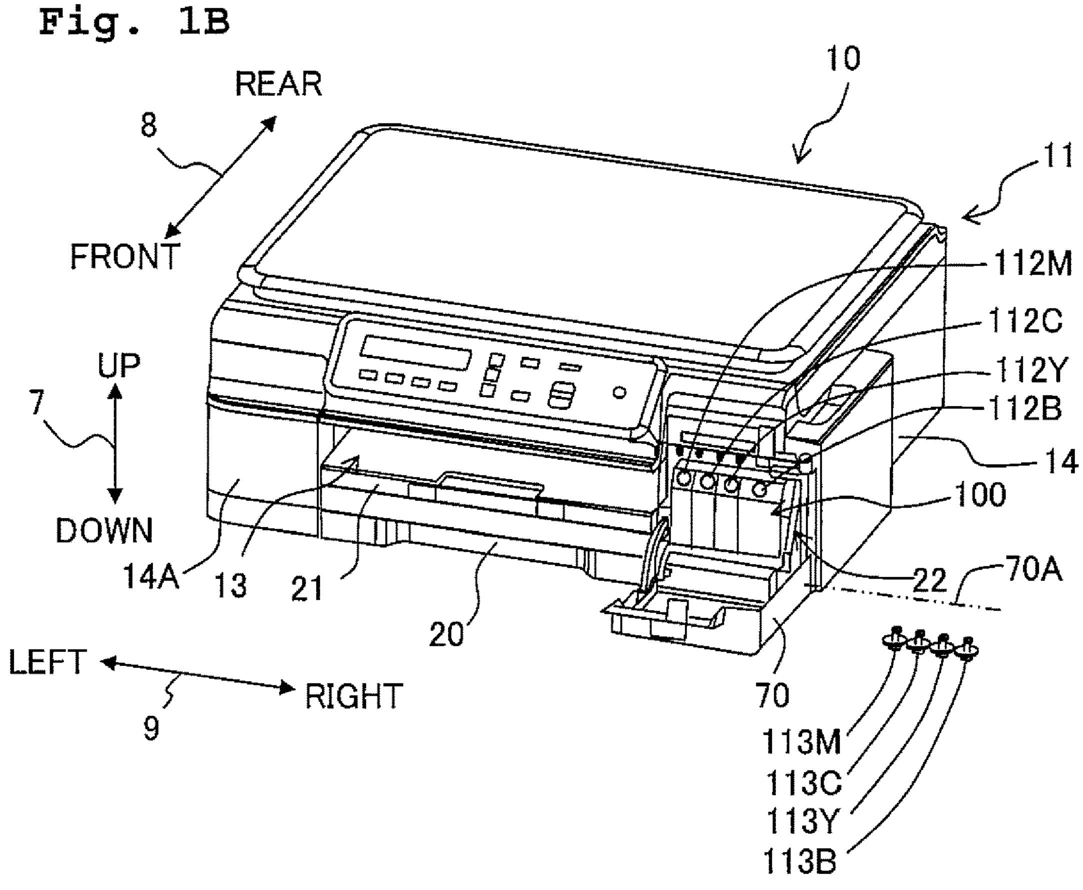

An embodiment of the present teaching will be described below. Note that, however, the embodiment described below is merely an example of the present teaching; it goes without saying that it is possible to make any appropriate changes in the embodiment of the present teaching without departing from the gist and scope of the present teaching. Further, in the following description, as depicted in FIGS. 1A and 1B, a state that a multi-function peripheral 10 is usably installed in a horizontal plane will be referred to as a "usable state" in some cases. An up-down direction 7 is defined based on the usable state as the reference. A front-rear direction 8 is defined such that a side on which an opening 13 of the multi-function peripheral 10 is provided is designated as the frontward side (front surface or front side), and a left-right direction 9 is defined as viewing the multi-function peripheral 10 from the frontward side (front surface). An upward direction is a component of the up-down direction 7, and a downward direction is a component of the up-down direction 7. The upward direction and the downward direction are mutually opposite directions. Similarly, each of a leftward direction and a rightward direction is a component of the left-right direction 9. Further, the leftward direction and the rightward direction are mutually opposite directions. Each of a frontward direction and a rearward direction is a component of the front-rear direction 8. Furthermore, the frontward direction and the rearward direction are mutually opposite directions. In the present embodiment, the up-down direction 7 corresponds to a perpendicular (vertical) direction, and the front-rear direction 8 and the left-right direction 9 each correspond to a horizontal direction.

<Overall Configuration of Multi-function Peripheral 10>

Figure 2:
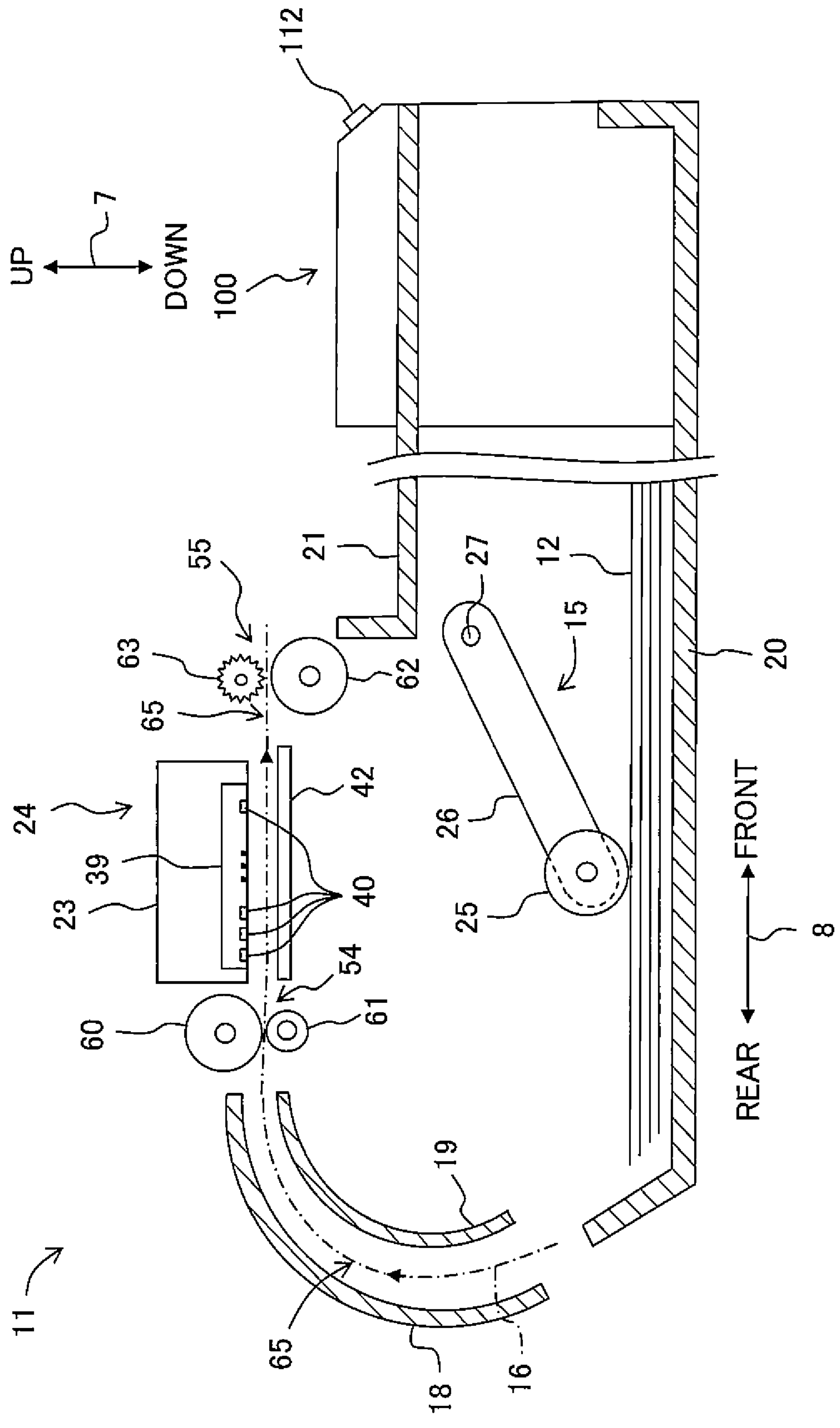
FIG. 2 is a vertical cross-sectional view schematically depicting the internal structure of a printer unit 11.

As depicted in FIGS. 1A and 1B, the multi-function peripheral 10 is formed to have a substantially rectangular parallelepiped shape. The multi-function peripheral 10 includes, at a lower portion thereof, a printer unit 11 which records an image onto a paper 12 (see FIG. 2) by an ink-jet recording method. The printer unit 11 includes a casing 14 having a front wall 14A and an opening 13 formed in the front wall 14A. As depicted in FIG. 2, the casing 14 has a feeding section 15, a feeding tray 20, a discharge tray 21, a conveyance roller section 54, a recording section 24, a discharge roller section 55, a platen 42, and an ink tank 100 (an example of a tank) each of which is arranged in the inside of the casing 14. Further, the multi-function peripheral 10 has various functions such as a facsimile function and a print function. The printer unit 11 is an example of a liquid consuming apparatus.

<Feeding Tray 20, Discharge Tray 21>

As depicted in FIGS. 1A and 1B, the feeding tray 20 is inserted into or removed from the multi-function peripheral 10 by a user, in the front-rear direction 8 through the opening 13. The opening 13 is formed in a central portion in the left-right direction 9 of the front surface of the multi-function peripheral 10. The feeding tray 20 is capable of supporting a plurality of sheets of the paper 12 that are stacked in the feeding tray 20. The discharge tray 21 is arranged at a position at the upper side of the feeding tray 20, and is inserted or removed together with the feeding tray 20. The discharge tray 21 supports the paper 12 discharged through a space between the recording section 24 and the platen 42 by the discharge roller section 55.

<Feeding Section 15>

The feeding section 15 feeds the paper 12 supported by the feeding tray 20 to a conveyance route 65. As depicted in FIG. 2, the feeding section 15 includes a feeding roller 25, a feeding arm 26, and a shaft 27. The feeding roller 25 is rotatably supported by the feeding arm 26 at a front end thereof. The feeding roller 25 rotates in a direction for causing the paper 12 to be conveyed in a conveyance direction 16 when a conveyance motor (not depicted in the drawings) is reversely rotated. In the following description, the rotations of the feeding roller 25, a conveyance roller 60, and a discharge roller 62 in the direction for causing the paper 12 to be conveyed in the conveyance direction 16 are each referred to as "normal rotation". The feeding arm 26 is pivotably supported by the shaft 27 supported by the frame of the printer unit 11. A bias is applied to the feeding arm 26 by an elastic force of a spring or by the self-weight of the feeding arm 26 such that the feeding arm 26 is pivoted and urged toward the feeding tray 20.

<Conveyance Route 65>

Figure 3:
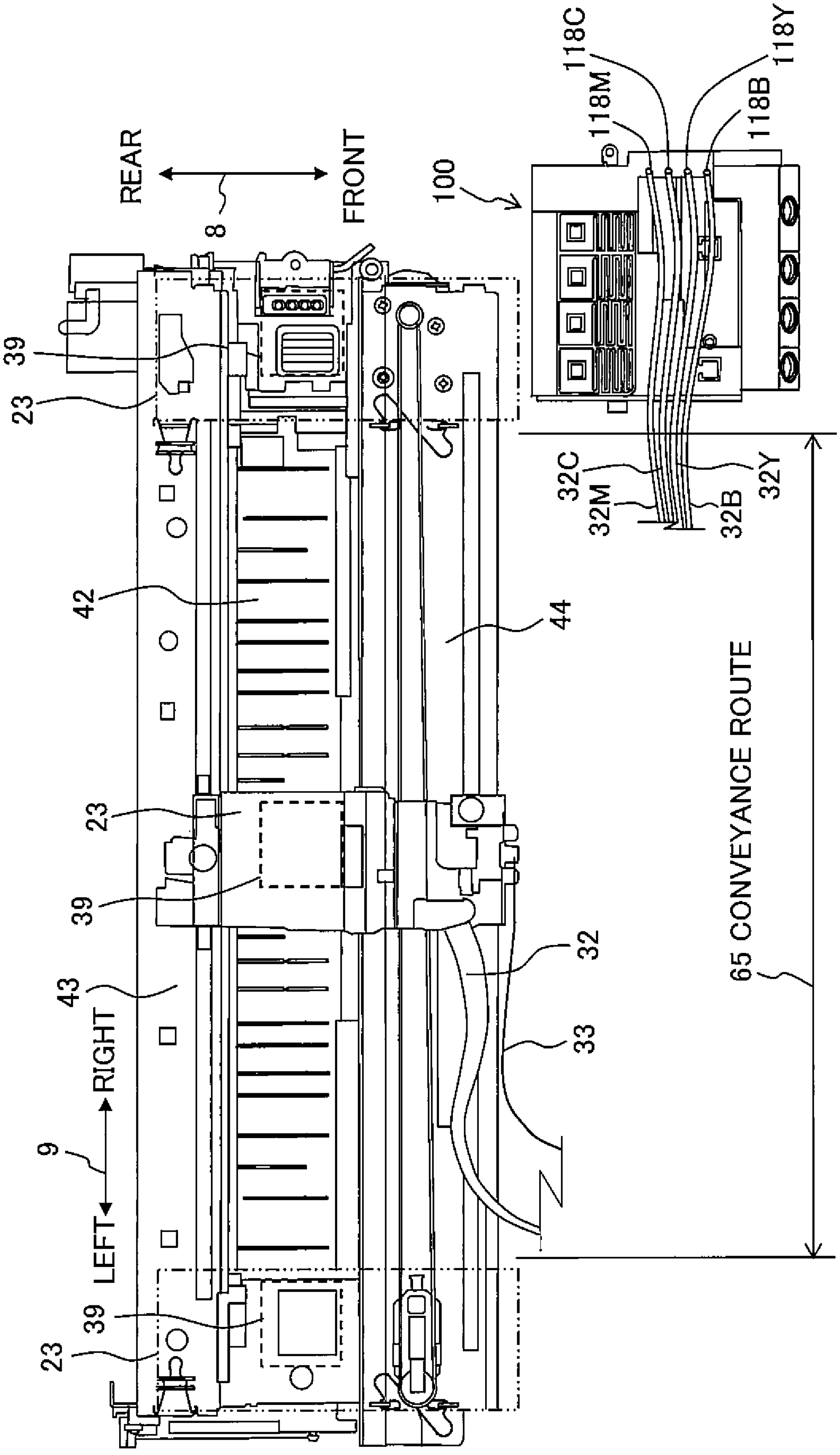
FIG. 3 is a plan view depicting the arrangement of a carriage 23 and an ink tank 100.

As depicted in FIG. 2, in the interior of the printer unit 11, a space is defined by an outer guide member 18 and an inner guide member 19 which are arranged to face with each other with a predetermined gap intervened therebetween. This space constructs a portion of a conveyance route 65. The conveyance route 65 is a route or path that is extended from a rear-end portion of the feeding tray 20 toward the rear side of the printer unit 11. Further, the conveyance route 65 makes a U-turn while being extended from the lower side to the upper side, at the rear side of the printer unit 11; and then the conveyance route 65 reaches the discharge tray 21 via a space between the recording section 24 and the platen 42. As depicted in FIGS. 2 and 3, a portion of the conveyance route 65 between the conveyance roller section 54 and the discharge roller section 55 is provided at a substantially central portion in the left-right direction 9 of the multi-function peripheral 10, and is extended in the front-rear direction 8. Note that in FIG. 2, the conveyance direction 16 of the paper 12 in the conveyance route 65 is indicated by an arrow of a dashed-dotted line.

<Conveyance Roller Section 54>

As depicted in FIG. 2, the conveyance roller section 54 is arranged at the upstream side of the recording head 24 in the conveyance direction 16. The conveyance roller section 54 includes the conveyance roller 60 and a pinch roller 61 which are facing each other. The conveyance roller 60 is driven by a conveyance motor. The pinch roller 61 rotates following the rotation of the conveyance roller 60. The paper 12 is conveyed in the conveyance direction 16 by being pinched between the conveyance roller 60 and the pinch roller 61 which are rotated positively by the normal rotation of the conveyance motor.

<Discharge Roller Section 55>

As depicted in FIG. 2, the discharge roller section 55 is arranged at the downstream side of the recording head 24 in the conveyance direction 16. The discharge roller section 55 includes the discharge roller 62 and a spur 63 which are facing each other. The discharge roller 62 is driven by the conveyance motor. The spur 63 rotates following the rotation of the discharge roller 62. The paper 12 is conveyed in the conveyance direction 16 by being pinched between the discharge roller 62 and the spur 63 which are rotated positively by the normal rotation of the conveyance motor.

<Recording Section 24>

As depicted in FIG. 2, the recording section 24 is arranged between the conveyance roller section 54 and the discharge roller section 55 in the conveyance direction 16. Further, the platen 42 and the recording section 24 are arranged to face each other in the up-down direction 7, while sandwiching the conveyance route 65 therebetween. Namely, the recording section 24 is arranged at a position at which the recording section 24 is located above the conveyance route 65 in the up-down direction 7 and at which the recording section 24 faces the conveyance route 65. The recording section 24 includes a carriage 23 and a recording head 39 (an example of a liquid consuming section).

As depicted in FIG. 3, the carriage 23 is supported by guide rails 43 and 44 which are extended respectively in the left-right direction 9, at positions separated respectively in the front-rear direction 8. The guide rails 43 and 44 are supported by the frame of the printer unit 11. The carriage 23 is connected to a known belt mechanism disposed on the guide rail 44. The belt mechanism is driven by a carriage motor (not depicted in the drawings). Namely, the carriage 23 connected to the belt mechanism reciprocates in the left-right direction 9 by being driven by the carriage motor. As depicted by alternate long and short dash lines in FIG. 3, the range of movement of the carriage 23 spans beyond the left and right end sides of the conveyance route 65 in the left-right direction 9.

Further, an ink tube 32 which connects the ink tank 100 and the recording head 39 and a flexible flat cable 33 which electrically connects the recording head 39 and a control circuit board having a controller (not depicted in the drawings) mounted thereon are extended from the carriage 23. The ink tube 32 supplies an ink stored in the ink tank 100 to the recording head 39. More specifically, four ink tubes 32B, 32M, 32C, and 32Y via which inks of respective colors (which are, for example, black, magenta, cyan, and yellow colors) are distributed are extended from the ink tank 100, and are connected to the carriage 23 in a bundled form. In the following description, these four ink tubes 32B, 32M, 32C, and 32Y will be collectively referred to as "ink tube(s) 32" in some cases. The flexible flat cable 33 transmits a control signal outputted from the controller to the recording head 39.

As depicted in FIG. 2, the recording head 39 is installed on the carriage 23. A plurality of nozzles 40 is formed in the lower surface of the recording head 39. End portions (tip portions) of the nozzles 40 are exposed from the lower surface of the recording head 39 and from the lower surface of the carriage 23 on which the recording head 39 is installed. In the following description, the surface through which the end portions of the nozzles 40 are exposed will be referred to as a "nozzle surface" in some cases. The recording head 39 jets or discharges the ink as fine ink droplets (minute ink droplets) through the nozzles 40. In a process of movement of the carriage 23, the recording head 39 jets the ink droplets toward the paper 12 supported by the platen 42. Accordingly, an image, etc. is recorded on the paper 12.

<Platen 42>

As depicted in FIGS. 2 and 3, the platen 42 is arranged between the conveyance roller section 54 and the discharge roller section 55 in the conveyance direction 16. The platen 42 is arranged so as to face the recording section 24 in the up-down direction 7, and supports the paper 12, conveyed by the conveyance roller section 54, from therebelow.

<Ink Tank 100>

The ink tank 100 is configured to store an ink to be supplied to the recording head 39. As depicted in FIGS. 1A and 1B and FIGS. 13A and 13B, the ink tank 100 is accommodated inside the casing 14. The ink tank 100 is fixed to the multi-function peripheral 10 such that the ink tank 100 cannot be easily removed from the multi-function peripheral 10.

The front surface of the ink tank 100 is exposed to the outside (exterior) of the multi-function peripheral 10 through an opening 22 formed in a front surface 14A of the casing 14 of the multi-function peripheral 10, at the right end of the front surface 14A in the left-right direction 9. The opening 22 is adjacent to the opening 13 in the left-right direction 9. Further, the casing 14 is provided with a cover 70 pivotable between a close position at which the cover 70 covers the opening 22 (see FIG. 1A), and an open position at which the cover 70 allows the opening 22 to be exposed to the outside of the multi-function peripheral 10 (at which the cover 70 does not cover the opening 22) (see FIG. 1B). The cover 70 in this embodiment is supported by the casing 14 to be pivotable about a pivot shaft 70A extended in the left-right direction 9 in the vicinity of a lower end portion in the up-down direction 7 of the casing 14.

Figure 4:
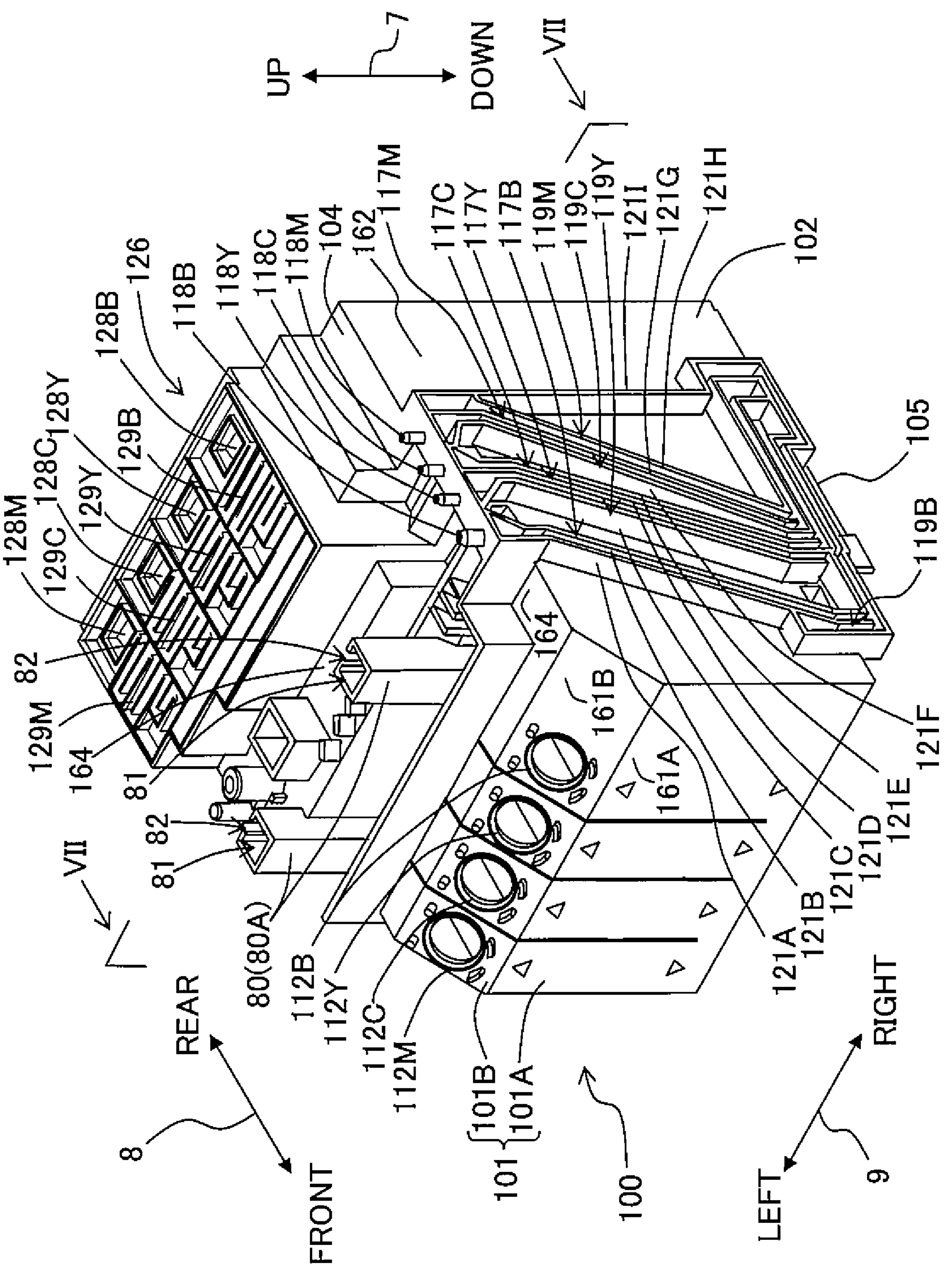
FIG. 4 is a front perspective view of the ink tank 100.
Figure 5:
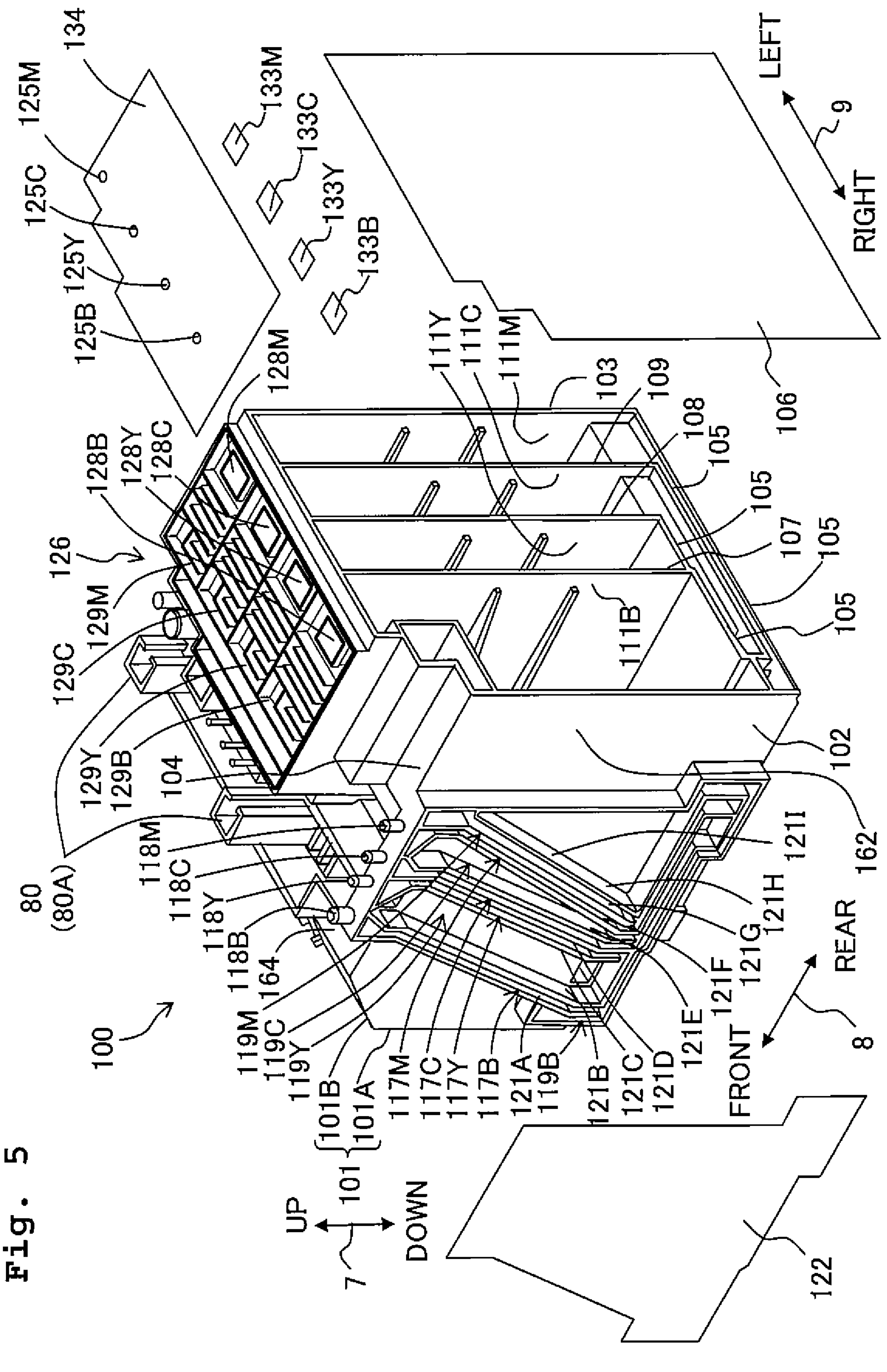
FIG. 5 is a rear perspective view of the ink tank 100.

As depicted in FIGS. 4 and 5, the ink tank 100 has a box-shaped body (box-shaped member) having a substantially rectangular parallelepiped shape, a film 106 and a positioning section 80.

The box-shaped body has a front wall 101, a right wall 102, a left wall 103, an upper wall 104, a lower wall 105, and partition walls 107, 108 and 109. The box-shaped body is formed of a resin having light transmitting property or translucency to such an extent that an ink inside an ink chamber 111 (to be described later on) is visible (visually observable or recognizable) from the outside of the ink tank 100. The box-shaped body is formed, for example, of polypropylene.

The front wall 101 is constructed of an erected wall 101A (an example of a first wall) which is extended substantially in the up-down direction 7 from the lower wall 105, and an inclined wall 101B (an example of a second wall) which is connected to an upper end of the erected wall 101A and to a front end of the upper wall 104, and is inclined with respect to the up-down direction 7 and the front-rear direction 8.

Figure 10:
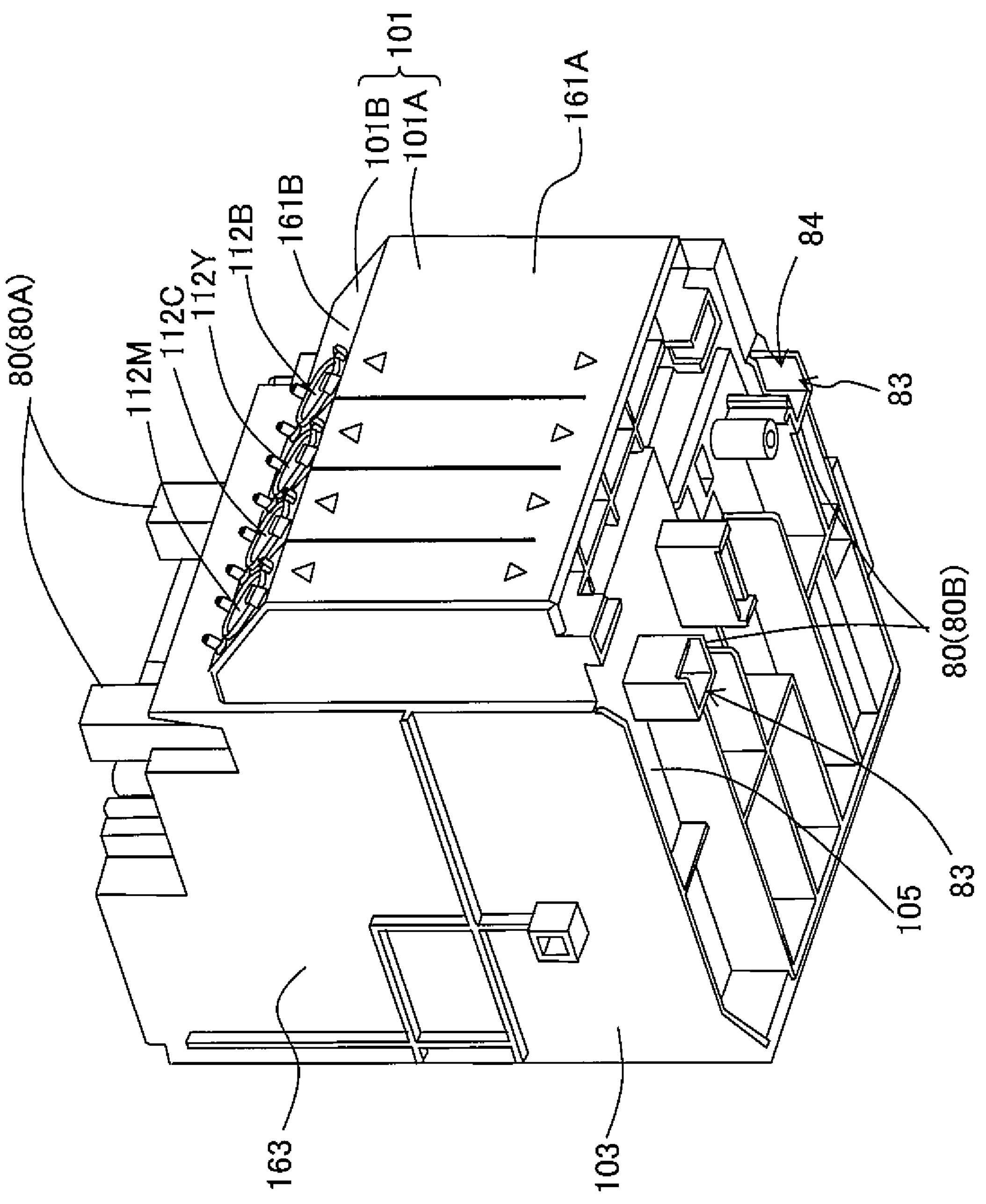
FIG. 10 is a front perspective view of the ink tank 100.

As depicted in FIGS. 4 and 5, the right wall 102 has a right surface 162 (an example of the outer surface of the right wall) extending in the up-down direction 7 and the front-rear direction 8. As depicted in FIG. 10, the left wall 103 has a left surface 163 (an example of the outer surface of the left wall) extending in the up-down direction 7 and the front-rear direction 8. As depicted in FIGS. 4 and 5, the upper wall 104 has an upper surface 164 (an example of the outer surface of the upper wall) extending in the front-rear direction 8 and the left-right direction 9. Note that the upper surface 164 is configured such that a plurality of surfaces, having mutually different heights in the up-down direction 7, are arranged in a stepped manner in the front-rear direction 8. As depicted in FIG. 10, the lower wall 105 has a lower surface 165 (an example of the outer surface of the lower wall) extending in the front-rear direction 8 and the left-right direction 9. As depicted in FIG. 5, the lower wall 105 is provided as a plurality of lower walls 105 each of which defines the bottom surface of one of a plurality of ink chambers 111 (to be described later on). As depicted in FIG. 4, the erected wall 101A has a front surface 161A (an example of the outer surface of the first wall) extending in the up-down direction 7 and the left-right direction 9; the inclined wall 101B has an inclined surface 161B (an example of the outer surface of the second wall) inclined relative to the up-down direction 7 and the front-rear direction 8. The inclined surface 161B crosses each of the front surface 161A and the upper surface 164.

The rear surface of the ink tank 100 is released (opened, uncovered). Further, by fixing a film 106 by welding to rear-end surfaces (rear-end portions) of the right wall 102, the left wall 103, the upper wall 104, the lower wall 105 and the partition walls 107, 108 and 109, the rear surface of the ink tank 100 is sealed. Namely, the film 106 forms or constructs the rear wall of the ink tank 100. The film 106 has, for example, a three-layered structure wherein polypropylene, nylon and polyethylene terephthalate are successively joined from the inner surface to the outer surface of the film 106, the inner surface being a surface welded to the rear end surfaces of the right wall 102, the left wall 103, the upper wall 104, the lower wall 105 and the partition walls 107, 108 and 109.

<Ink Chamber 111>

As depicted in FIG. 5, the plurality of partition walls 107, 108 and 109 which define or demarcate the internal space of the ink tank 100 is provided in the interior of the ink tank 100. Each of the partition walls 107, 108 and 109 is extended in the up-down direction 7 and the front-rear direction 8, and is connected to the front wall 101, the upper wall 104, the lower wall 105 and the film 106. Further, the partition walls 107, 108 and 109 are disposed to be separated and away from one another in the left-right direction 9. As a result, the internal space of the ink tank 100 (an example of the space of the ink tank in the present teaching) is partitioned into four ink chambers 111B, 111Y, 111C and 111M (an example of the plurality of spaces in the present teaching) that are adjacent in the left-right direction 9, by the front wall 101, the right wall 102, the left wall 103, the upper wall 104, the lower wall 105 and the partition walls 107 to 109.

The ink chamber 111B is a space demarcated by the front wall 101, the right wall 102, the upper wall 104, the lower wall 105, the film 106 and the partition wall 107. The ink chamber 111Y is a space demarcated by the front wall 101, the upper wall 104, the lower wall 105, the film 106 and the partition walls 107 and 108. The ink chamber 111C is a space demarcated by the front wall 101, the upper wall 104, the lower wall 105, the film 106 and the partition walls 108 and 109. The ink chamber 111M is a space demarcated by the front wall 101, the left wall 103, the upper wall 104, the lower wall 105, the film 106 and the partition wall 109.

In the following description, the ink chambers 111B, 111Y, 111C, and 111M are collectively referred to as "ink chamber(s) 111" in some cases. Further, reference numerals which are similar except for having different alphabetic suffixes (B, M, C, and Y) are assigned to four components provided while corresponding to the ink chambers 111B, 111M, 111C and 111Y, respectively; in a case that these components are collectively referred to, then these components are assigned with a reference numeral(s) while omitting the respective alphabetic suffixes, in some cases.

Inks of different colors are stored in the ink chambers 111, respectively. Specifically, black ink is stored in the ink chamber 111B, cyan ink is stored in the ink chamber 111C, magenta ink is stored in the ink chamber 111M, and yellow ink is stored in the ink chamber 111Y. Each of the color inks is an example of a liquid. However, the number of ink chambers 111 and the colors of the inks are not restricted to the number and the colors in the above-described example. The ink chambers 111 are arranged along the left-right direction 9. Further, among the four ink chambers 111B, 111Y, 111C and 111M, the ink chamber 111B is arranged at the rightmost side and the ink chamber 111M is arranged at the leftmost side. Furthermore, the ink chamber 111B has a volume larger than the any other ink chambers 111Y, 111C and 111M.

<Inlet 112>

The inclined wall 101B of the ink tank 100 is provided with inlets 112B, 112Y, 112C, and 112M (hereinafter, collectively referred to as "inlet(s) 112" in some cases) for allowing the inks to flow into the ink chambers 111, respectively. The inlet 112 penetrates through the inclined wall 101B in a direction of the thickness of the inclined wall 101B, and makes the corresponding ink chamber 111 communicate with the outside of the ink tank 100. The inner surface of the inclined wall 101B faces the ink chamber 111, and the outer surface of the inclined wall 101B faces the outside of the ink tank 100. Consequently, the inlet 112 allows the ink chamber 111 and the outside of the ink tank 100 to directly communicate with each other. Namely, between the inlet 112 and the ink chamber 111, there is no channel which is bent or curved and which has a cross-sectional area smaller than the cross-sectional area of the inlet 112.

The inclined wall 101B and the inlet 112 provided on the inclined wall 101B are exposed to the outside of the multi-function peripheral 10 via the opening 22 when the cover 70 is positioned at the open position as depicted in FIG. 1B. In the present embodiment, the posture of the ink tank 100 when the ink is poured or refilled into the ink chamber 111 through the inlet 112 (refilling posture) coincides with the posture of the ink tank 100 when the multi-function peripheral 10 is in the usable state. Namely, when the multi-function peripheral 10 is in the usable state, the ink is refilled into the ink chamber 111 through the inlet 112.

Since the inlet 112 is formed in the inclined wall 101B of the ink tank 100, the inlet 102 is oriented to face the outside of the casing 14 and face obliquely upward relative to the casing 14. In other words, a virtual plane including the inlet 112 is along the inclined wall 101B and is inclined relative to the up-down direction 7 and the front-rear direction 8; and a direction orthogonal to the virtual plane and oriented toward the outside of the ink tank 100 from the inlet 112 is an obliquely upward direction.

The ink tank 100 has caps 113B, 113Y, 113C and 113M (hereinafter collectively referred to as "cap(s) 113" in some cases) that are detachably attached with respect to the inclined wall 101B so as to close or block the inlets 112. As depicted in FIG. 1A, the cap 113 attached to the inclined wall 101B blocks or closes the inlet 112 by making a tight contact with a portion, of the wall surface, which defines the periphery of the inlet 112. On the other hand, as depicted in FIG. 1B, in a case that the cap 113 is removed from the inclined wall 101B, the inlet 112 is open (released). The cap 113 is detachably attached to the inclined wall 101B in a state that the cover 70 is located at the open position. Further, by removing the cap 113 from the inlet 112, the ink can be refilled into the ink chamber 111 via the inlet 112.

<Ink Outflow Channel 114>

The box-shaped body of the ink tank 100 has a plurality of ink outflow channels 114, as depicted in FIGS. 6 to 9B. The ink outflow channel 114*s* are provided as four ink outflow channels 114B, 114Y, 114C and 114M (hereinafter collectively referred to as "ink outflow channel(s) 114" in some cases; an example of a liquid outflow channel) corresponding to the four ink chambers 111B, 111Y, 111C and 111M, respectively. The ink outflow channels 114B, 114Y, 114C and 114M are connected to the ink chambers 111B, 111Y, 111C and 111M, respectively. The ink outflow channel 114 is a channel that allows the ink stored in the corresponding ink chamber 111 to flow out from the ink tank 100. The ink outflow channel 114 in the embodiment is a channel extending from the corresponding ink chamber 111 and arriving up to the right surface 162 of the ink tank 100.

Figure 7:
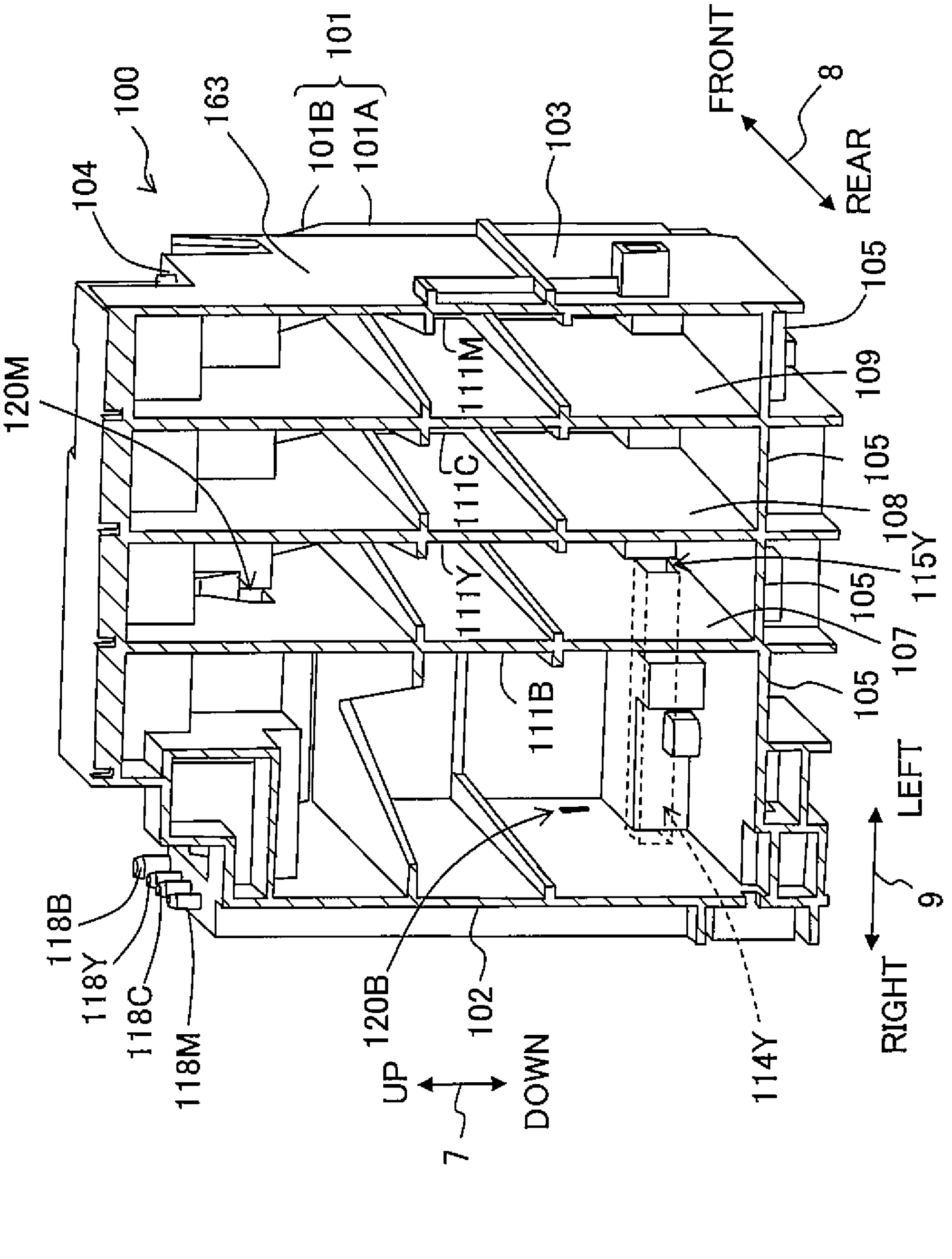
FIG. 7 is a cross-sectional perspective view along a line VII-VII in FIG. 4.
Figure 8:
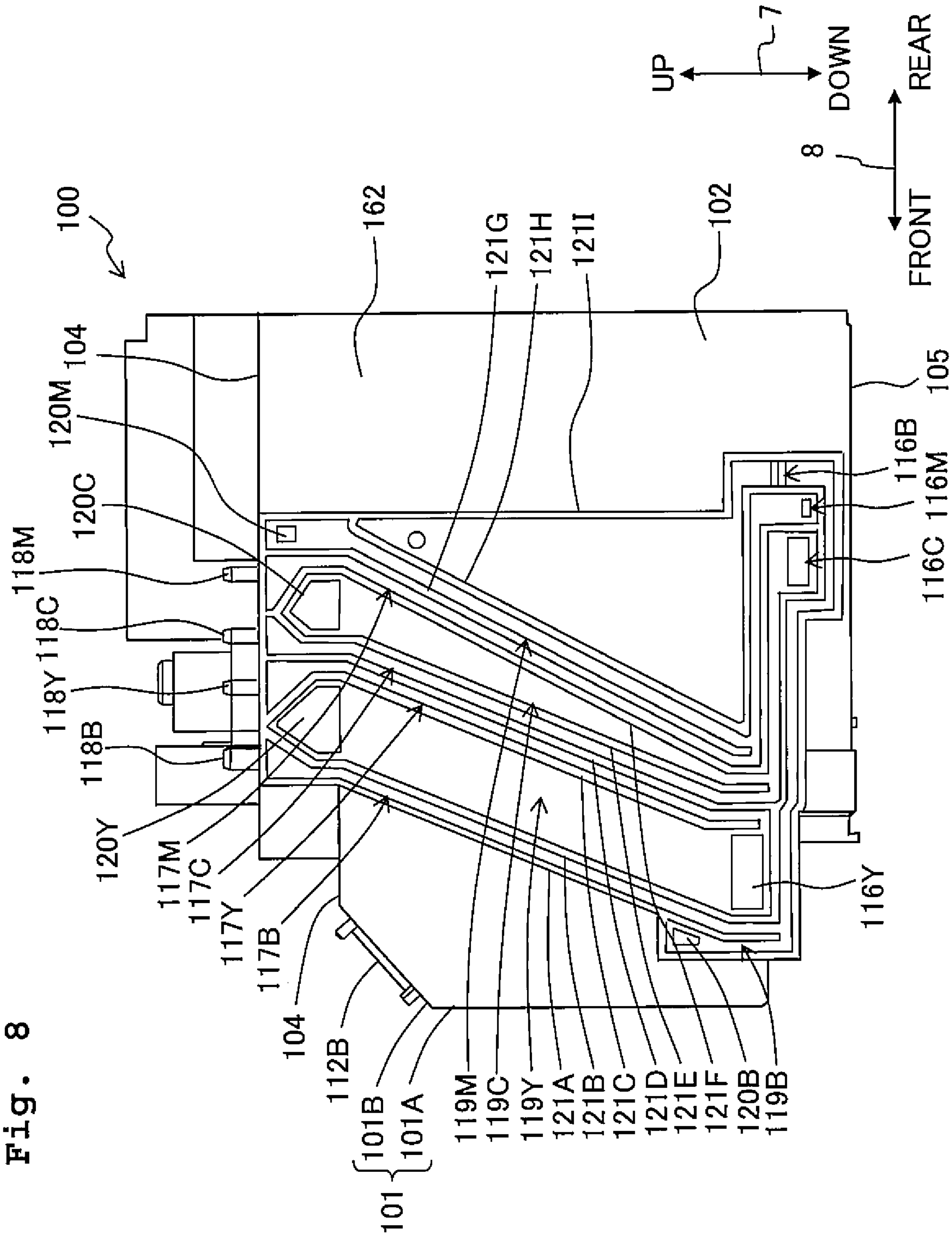
FIG. 8 is a right side view of the ink tank 100.

As depicted in FIG. 7, the ink outflow channel 114Y communicates with the ink chamber 111Y through an opening 115Y provided near the lower end of the partition wall 107 which demarcates the right surface of the ink chamber 111Y. Further, the ink outflow channel 114Y reaches the right surface 162 of the ink tank 100 through an opening 116Y provided on the right wall 102 as depicted in FIG. 8. More specifically, the ink outflow channel 114Y is formed to extend rightward along the left-right direction 9 from the opening 115Y, and reaches the opening 116Y penetrating through the right wall 102 (namely, reaches the right surface 162 of the ink tank 100).

Figure 9B:
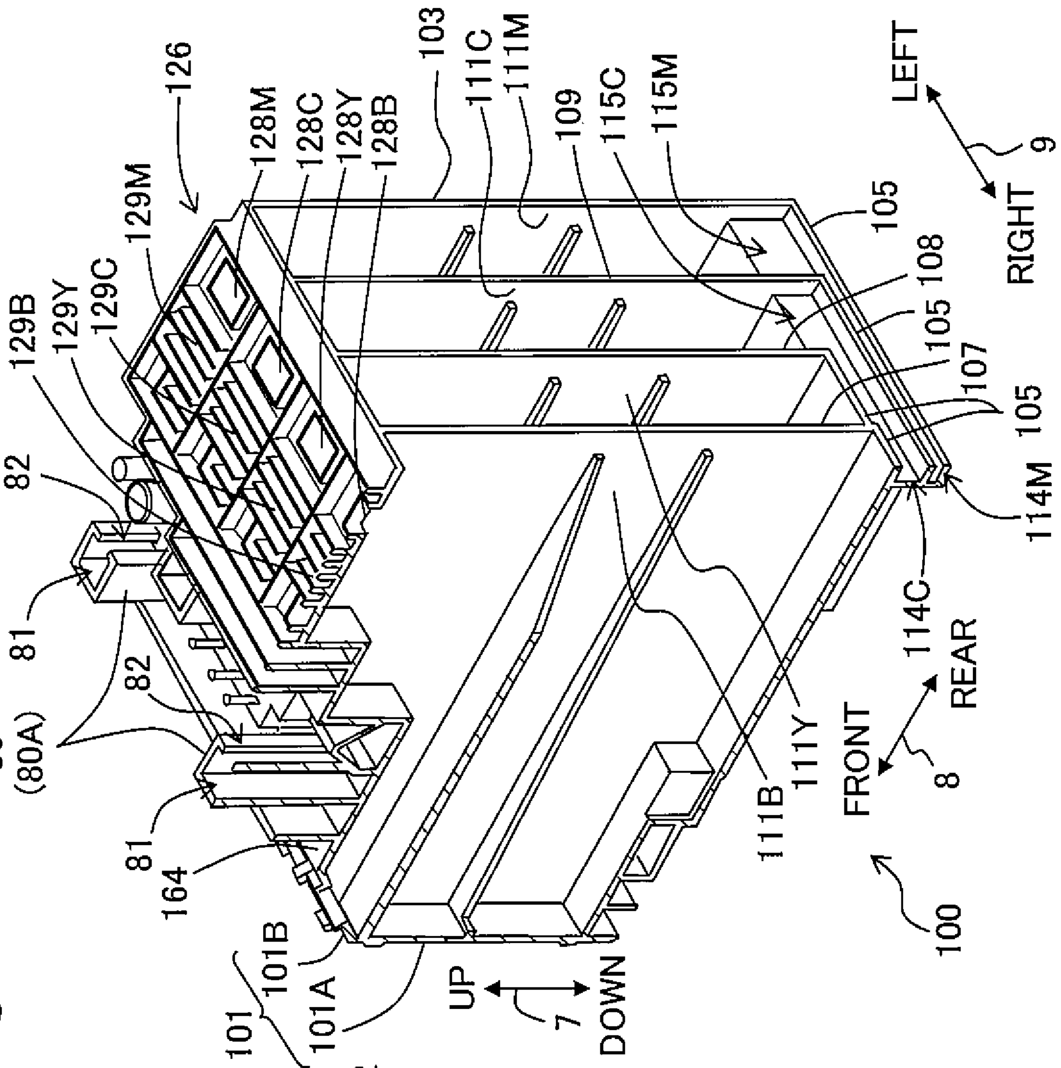
FIG. 9B is a cross-sectional perspective view along a line IXB-IXB in FIG. 9A.
Figure 9A:
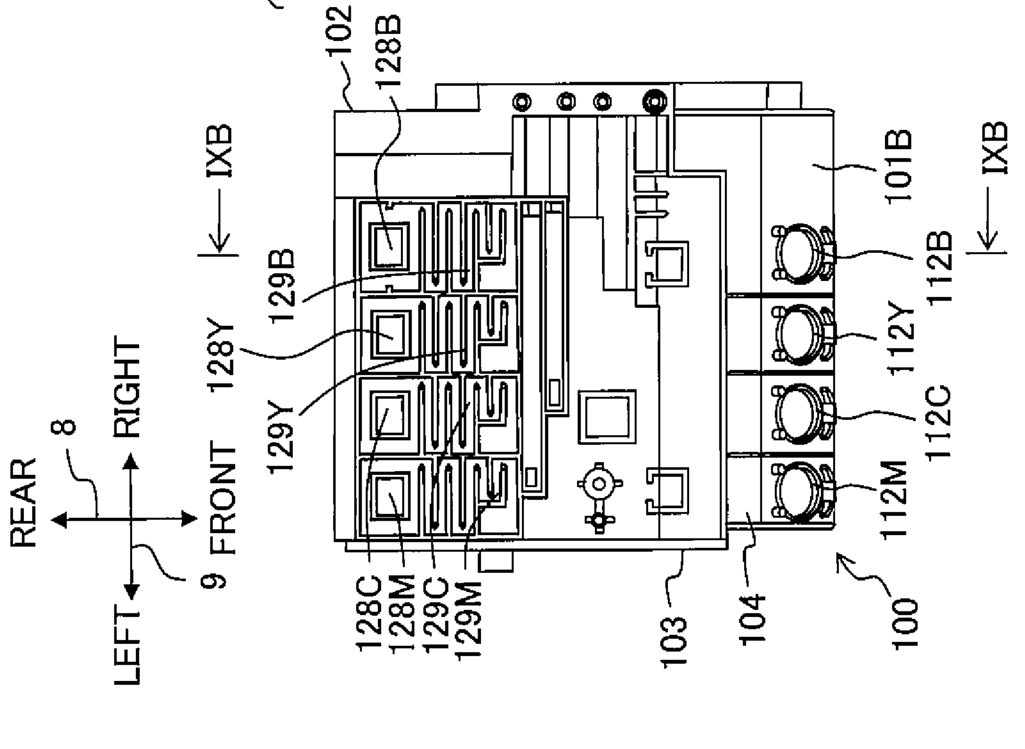
FIG. 9A is a plane view of the ink tank 100.

As depicted in FIG. 9B, the ink outflow channel 114C communicates with the ink chamber 111C through an opening 115C provided near the rear end of the partition wall 105 which demarcates the bottom surface of the ink chamber 111C. Further, as depicted in FIG. 6, the ink outflow channel 114C is formed to extend rightward from the opening 115C and then extend frontward, and reaches the right surface 162 of the ink tank 100 via an opening 116C formed in the right wall 102 as depicted also in FIG. 8.

As depicted in FIG. 9B, the ink outflow channel 114M communicates with the ink chamber 111M through an opening 115M provided near the rear end of the lower wall 105 which demarcates the bottom surface of the ink chamber 111M. Further, as depicted in FIG. 6, the ink outflow channel 114M is formed to extend rightward from the opening 115M and then extend frontward, and reaches the right surface 162 of the ink tank 100 via an opening 116M formed in the right wall 102 as depicted also in FIG. 8.

Figure 6:
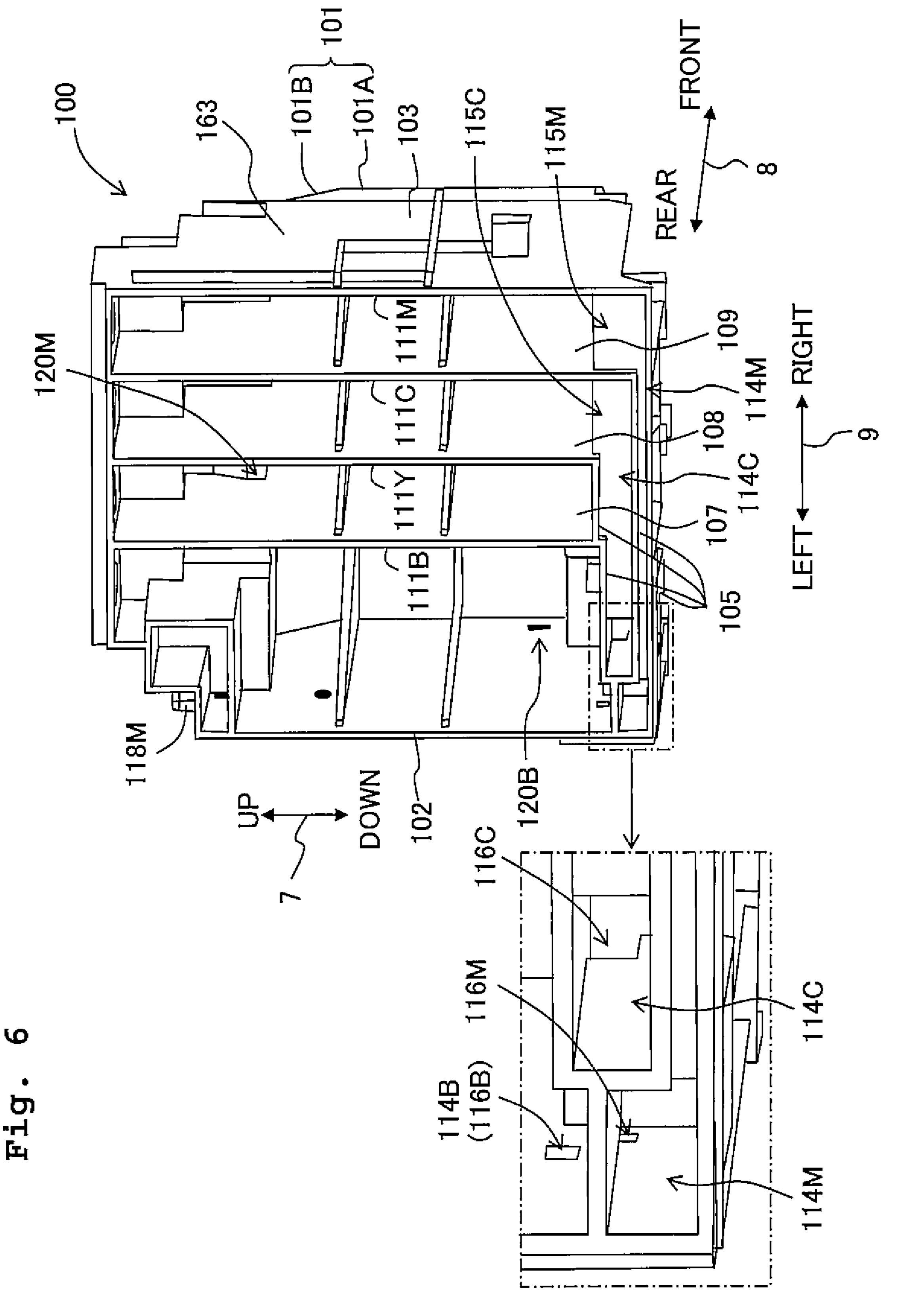
FIG. 6 is a rear perspective view of the ink tank 100.

As depicted in FIG. 6, the ink outflow channel 114B communicates with the ink chamber 111B through an opening 116B provided near the lower end and the rear end of the right wall 102 which demarcates the right surface and the bottom surface, respectively, of the ink chamber 111B. Further, the ink outflow channel 114B reaches the right surface 162 of the ink tank 100 through the opening 116B formed in the right wall 102 as depicted in also FIG. 8.

<Ink Lead-out Channel 117, Return Channel 119>

The box-shaped body of the ink tank 100 has a plurality of ink lead-out channels 117 (an example of a liquid lead-out channel) as will be described below. As depicted in FIG. 8, the plurality of ink lead-out channels 117 are provided as ink lead-out channels 117B, 117Y, 117C and 117M on the right surface 162 of the ink tank 100. One ends of the ink lead-out channels 117B, 117Y 117C and 117M are connected respectively to the ink outflow channels 114B, 114Y, 114C, and 114M corresponding thereto each at a position at which one of the openings 116B, 116Y, 116C and 116M is located; and the other ends of the ink lead-out channels 117B, 117Y, 117C and 117M are connected respectively to connecting sections 118B, 118Y, 118C, and 118M. The four ink tubes 32B, 32Y, 32C and 32M (see FIG. 3) corresponding to inks of the four colors respectively are connected to the connecting sections 118 each provided to project from the upper wall 104 of the ink tank 100. Namely, each of the ink lead-out channels 117 is a channel that guides the ink outflowed from the ink chamber 111 through the ink outflow channel 114 corresponding to the ink lead-out channel 117 to the recording head 39 through one of the ink tubes 32 connected to the connecting section 118 corresponding to the ink lead-out channel 117. The volumes of the ink lead-out channels 117B, 117Y, 117C and 117M are substantially same with one another, and the volumes of the ink tubes 32B, 32Y, 32C and 32M are substantially same with one another.

Further, as depicted in FIG. 8, the right surface 162 of the ink tank 100 is provided with return channels 119B, 119Y, 119C and 119M. One ends of the return channels 119B, 119Y, 119C and 119M are connected to the ink outflow channels 114B, 114Y, 114C and 114M respectively; and the other ends of the return channels 119B, 119Y, 119C and 119M communicate with the ink chambers 111 corresponding thereto through openings 120B, 120Y, 120C and 120M, respectively. Note that the openings 116 and 120 are provided at different positions in the up-down direction 7. More specifically, the openings 120 are provided each at a position above the opening 116 corresponding thereto in the up-down direction 7.

As depicted in FIG. 8, the right wall 102 of the ink tank 100 is provided with a plurality of projected walls 121A to 121I (hereinafter referred to collectively as a "projected wall(s) 121" in some cases). The projected wall 121 is projected rightward (toward the right side) from the right surface 162 of the right wall 102, and is extended along the right surface 162 of the right wall 102. Further, a film 122 (see FIG. 5) is attached by welding to the right side end portions of the projected walls 121. The single (common) film 122 is welded to the projected walls 121A to 121I of the present embodiment. The ink lead-out channels 117 and the return channels 119 define spaces demarcated by the adjacent projected walls 121A to 121H and by the film 122.

Note that in the embodiment, the channel resistances of the return channels 119Y, 119C and 119M are set to be greater than the channel resistances of the ink outflow channels 114Y, 114C and 114M corresponding thereto, respectively. Although there are various methods for changing the channel resistance, it is possible to increase the channel resistance by, for example, increasing the channel length, decreasing the cross-sectional area of the channel, or combination of the above, etc.

<Atmosphere Communicating Channel 126>

As depicted in FIG. 9B, an atmosphere communication channel 126 is formed in the upper wall 104 of the box-shaped body of the ink tank 100. The atmosphere communication channel 126 is provided as four atmosphere communicating channels 126 corresponding to the four ink chambers 111B, 111Y, 111C and 111M, respectively. Each of the four atmosphere communication channels 126 are constructed of one of first through holes 128B, 128Y, 128C and 128M, one of labyrinths 129B, 129Y, 129C and 129M, one of semipermeable membranes 133 (133B, 133Y, 133C and 133M) (see FIG. 5) and a film 134 (see FIG. 5).

The semipermeable membrane 133 is adhered to the first through hole 128. The semipermeable membrane 133 is a porous membrane having minute holes which prevent the ink from passing through the minute holes and allows a gas to pass through the minute holes; the semipermeable membrane 133 is formed, for example, of a fluoro-resin such as polytetrafluoro-ethylene, polychlorotrifluoro-ethylene, a tetrafluoroethylene-hexafluoropropylene copolymer, a tetrafluoroethylene-perfluoroalkylvinylether copolymer, a tetrafluoroethylene-ethylene copolymer, etc. Further, a space above the first through hole 128 and a space above the labyrinth 129 are covered by the film 134.

The first through holes 128B, 128Y, 128C and 128M are formed at one ends of the labyrinths 129B, 129Y, 129C and 129M, respectively. The atmosphere communication channels 126 are communicated with the ink chambers 111B, 111Y, 111C and 111M via the first through holes 128B, 128Y, 128C and 128M, respectively.

The other ends of the labyrinths 129B, 129Y, 129C and 129M are formed with spaces each of which is greater than the remaining portion of one of the labyrinths 129B, 129Y, 129C and 129M different from the other end thereof. As depicted in FIG. 5, second through holes 125B, 125Y, 125C and 125M are formed in the film 134 at positions facing the greater spaces defined in the labyrinths 129, respectively. The atmosphere communication channels 126 are communicated with the outside of the ink tank 100 via the second through holes 125B, 125Y, 125C and 125M, respectively.

With the above-described configuration, the atmosphere communicating channel 126 allows the air to inflow and outflow between the ink chamber 111 and the outside of the ink tank 100, via the first through hole 128, the labyrinth 129 and the second through hole 125.

<Cap 113>

As depicted in FIGS. 1A and 1B, the cap 113 can be attached to and detached from the inclined wall 101B so as to close and open the inlet 112 of the ink tank 100. The cap 113 is provided as four caps 113B, 113Y, 113C and 113M (hereinafter collectively referred to as "cap(s) 113") corresponding to the four inlets 112B, 112Y, 112C and 112M of the ink tank 100, respectively. In a state that the cap 113 is attached to the inclined wall 101B, the cap 113 makes contact with a portion of the wall surface defining the circumferential edge of the inlet 112 while the cap 113 is deformed elastically, thereby sealing the inlet 112 in a liquid-tight manner. In a state that the cap 113 is removed or detached from the inclined wall 101B, an ink bottle 136 can be inserted into the inlet 112. By doing so, the ink can be poured from the ink bottle 136 into the ink chamber 111.

<Cover 70>

As depicted in FIGS. 1A and 1B, the cover 70 is provided on the casing 14 so that the cover 70 can open and close the opening 22 formed in the front wall 14A of the casing 14. The cover 70 is pivotable around (about) the pivot shaft 70A extended in the left-right direction 9. The cover 70A has an outer shape of which size corresponds to the opening 22, and is a box-shaped body which is open toward the opening 22. In a state that the cover 70 is in the close position, the cover 70 covers the erected wall 101A and the inclined wall 101B of the front wall 101 of the ink tank 100. In a state that the cover 70 is in the open position, the cover 70 allows the erected wall 101A and the inclined wall 101B of the front wall 101 of the ink tank 100 to be exposed to the outside of the casing 14. Note that the cover 70 is omitted from the illustration in FIGS. 12 to 15.

<Positioning Section 80>

As depicted in FIG. 10, a positioning section 80 is provided on the upper surface 164 of the upper wall 104 and the lower surface 165 of the lower wall 105 of the ink tank 100. The positioning section 80 includes a plurality (two pieces in this embodiment) of positioning sections 80A provided on the upper wall 104, and a plurality (two pieces in this embodiment) of positioning sections 80B provided on the lower wall 105.

As depicted in FIG. 4, the positioning sections 80A extend upwardly from the upper surface 164. Each of the positioning sections 80A has a hollow pillar-shape having an internal space. An extended end portion (upper end portion) of the positioning section 80A has an opening 81 formed therein and open downward toward the internal space of the positioning section 80A. The opening 81 is continued or connected to the internal space of the positioning section 80A. A rear portion of the positioning section 80A is formed with an opening 82 which is open from the upper end to the lower end of the positioning section 80A. The opening 82 is continued to the opening 81 and the internal space of the positioning section 80A.

As depicted in FIG. 10, the positioning sections 80B extend downwardly from the lower surface 165. Each of the positioning sections 80B has a hollow pillar-shape having an internal space. An extended end portion (lower end portion) of the positioning section 80B has an opening 83 formed therein and open upward toward the internal space of the positioning section 80B. The opening 83 is continued to the internal space of the positioning section 80B. At a front portion of a positioning section 80B which is included in the two positioning sections 80B and located on the right side is formed with an opening 84 which is formed as a notch extending from the upper end to the lower end of the positioning section 80B. The opening 84 is continued to the opening 83 and the internal space of the positioning section 80B located on the right side.

As depicted in FIG. 4, the positioning sections 80A are arranged behind the inlets 112. Further, the positioning sections 80A are arranged in front of the atmosphere communication channels 126. Namely, the positioning sections 80A are arranged between the inlets 112 and the atmosphere communication channels 126 in the front-rear direction 8.

Figure 11:
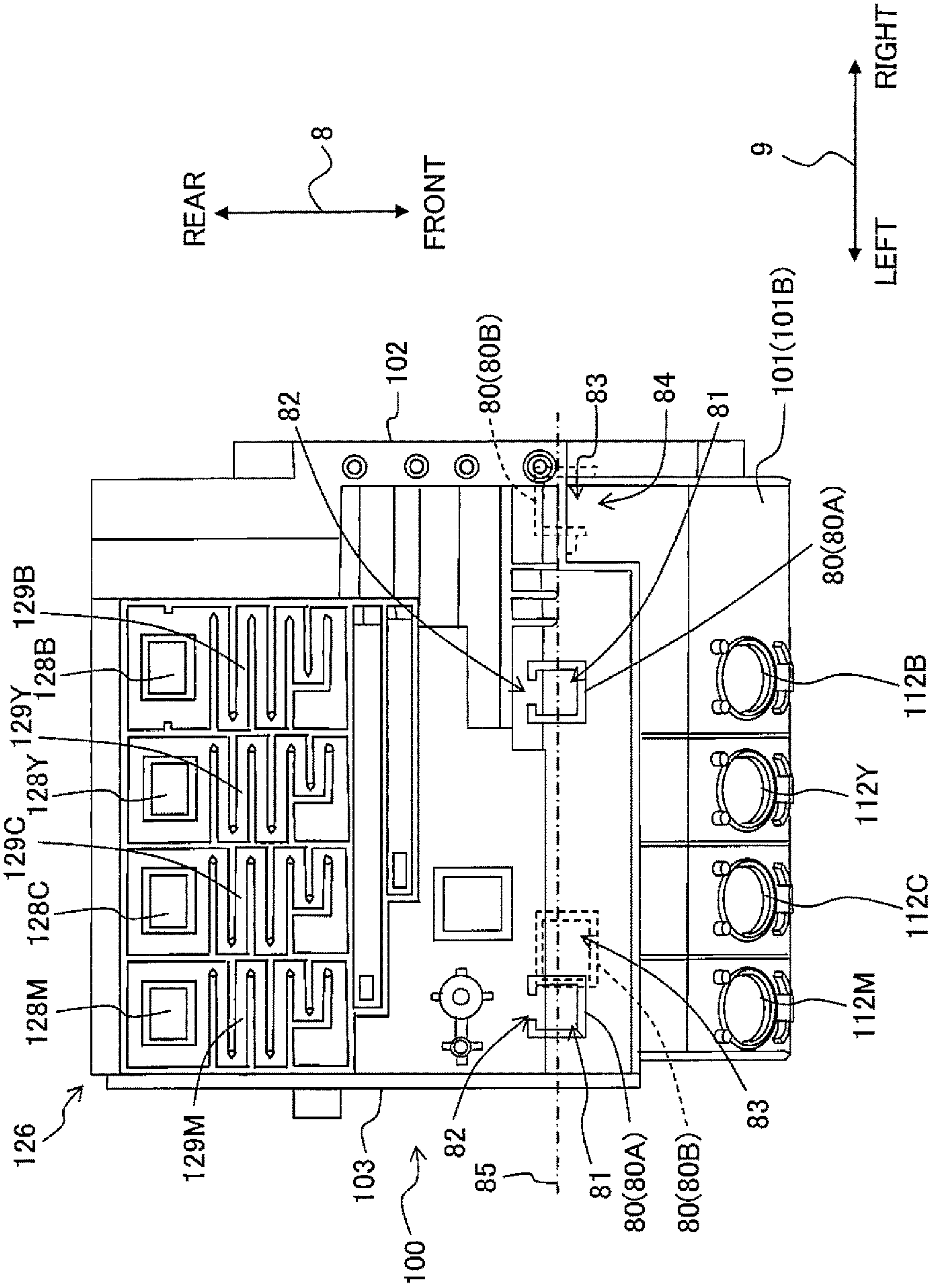
FIG. 11 is a plane view of the ink tank 100 for depicting the positional relationship between positioning sections 80A and 80B.

The positioning sections 80B are each arranged at such a position that at least one of the front end portion and rear end portion of the positioning section 80B is located behind the front end portion of the positioning section 80A and located in front of the rear end portion of the positioning section 80A. In other words, as depicted in FIG. 11, the positioning sections 80A and 80B are each arranged at a position crossing a same plane 85 which is orthogonal to the front-rear direction 8.

<Projections 87, 89>

Figure 12B:
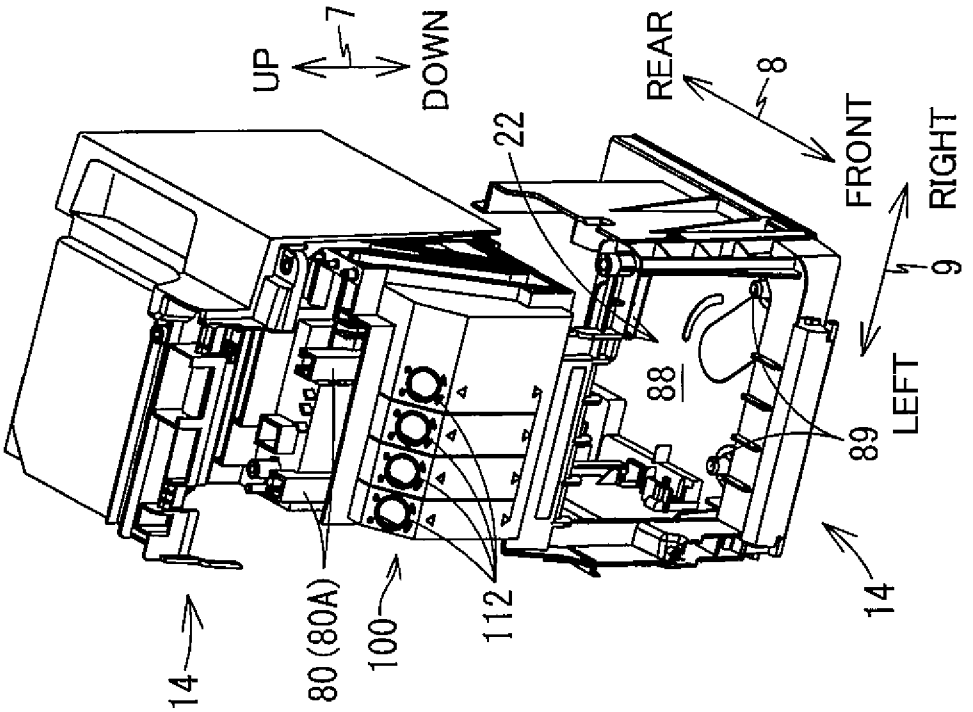
FIGS. 12A and 12B are each an exploded perspective view depicting a front right lower portion of a casing 14 and the ink tank 100.
Figure 12A:
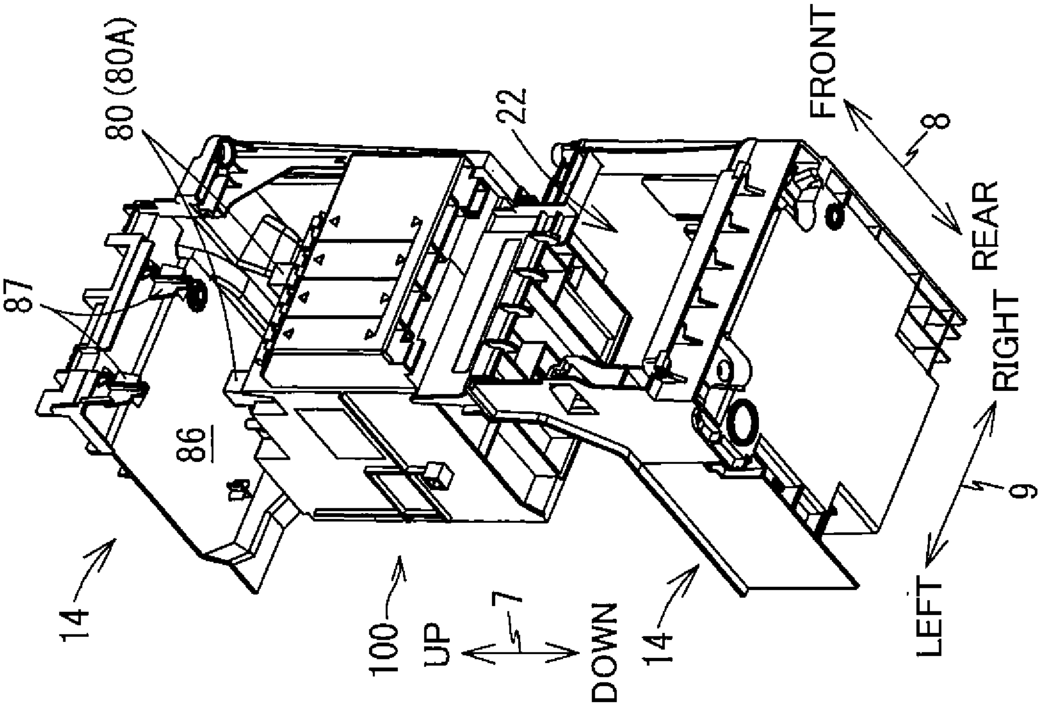
Figure 13B:
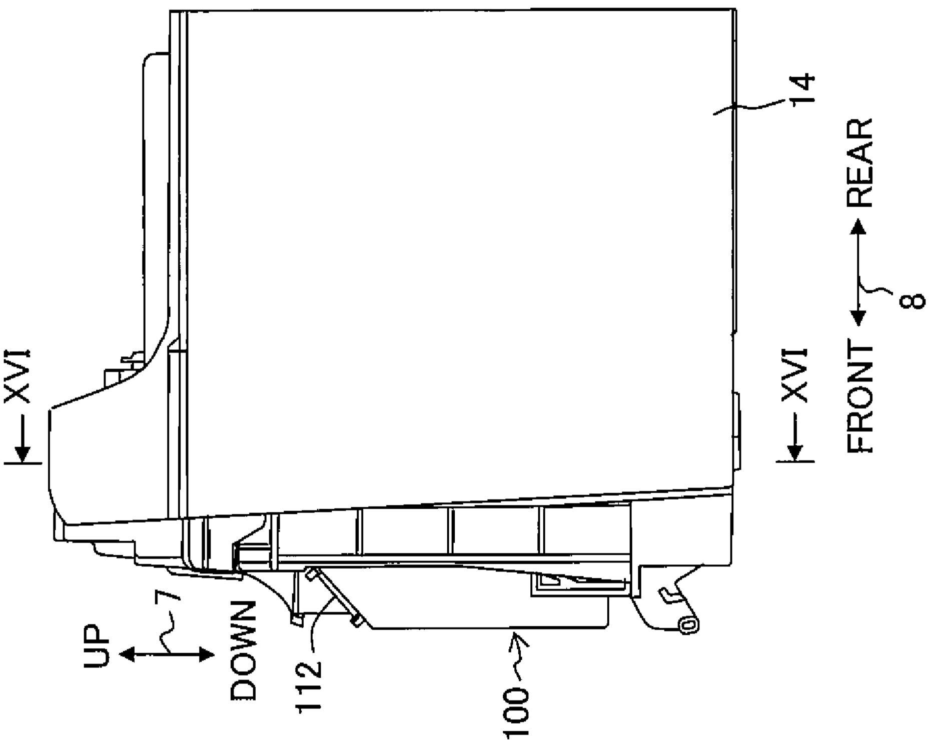
Figure 13A:
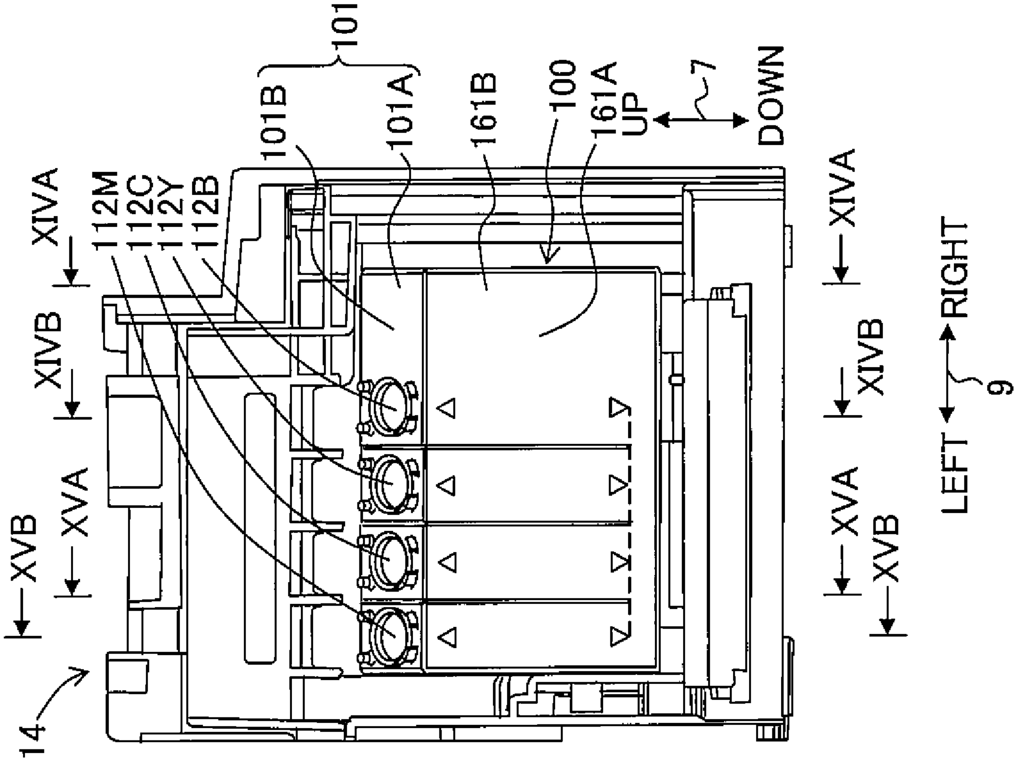

As depicted in FIG. 12A, two projections 87 extending downward are formed on a top surface 86 defining a space arranged behind the opening 22 in the casing 14. In other words, the two projections 87 extending downward are formed on the top surface 86 defining an upper portion of the space in which the ink tank 100 is accommodated in the casing 14. Each of the projections 87 is arranged at a position corresponding to one of the positioning sections 80A of the ink tank 100 accommodated in the casing 14.

As depicted in FIG. 12B, two projections 89 extending upward are formed on a bottom surface 88 defining the space arranged behind the opening 22 in the casing 14. In other words, the two projections 89 extending upward are formed on the bottom surface 88 defining a lower portion of the space in which the ink tank 100 is accommodated in the casing 14. Each of the projections 89 is arranged at a position corresponding to one of the positioning sections 80B of the ink tank 100 accommodated in the casing 14.

<Attachment of Ink Tank 100 to Casing 14>

The multi-function peripheral 10 in the usable state is in a state that the multi-function peripheral 10 is placed on the horizontal plane extending in the front-rear direction 8 and the left-right direction 9. As will be described in detail in the following, the box-shaped body of the ink tank 100 is positioned at the posture depicted in FIGS. 1A, 1B and FIG. 13 when the multi-function peripheral 10 is in the usable state.

Figure 14B:
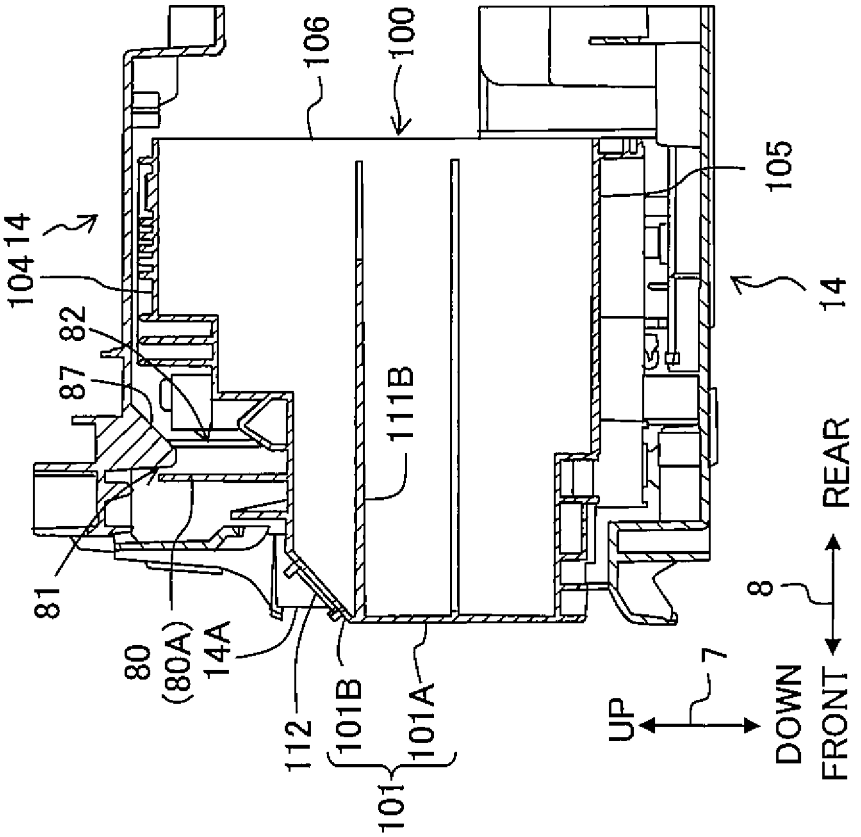
FIG. 14B is a cross-sectional view along a line XIVB-XIVB of FIG. 13A.
Figures 15A, 15B:
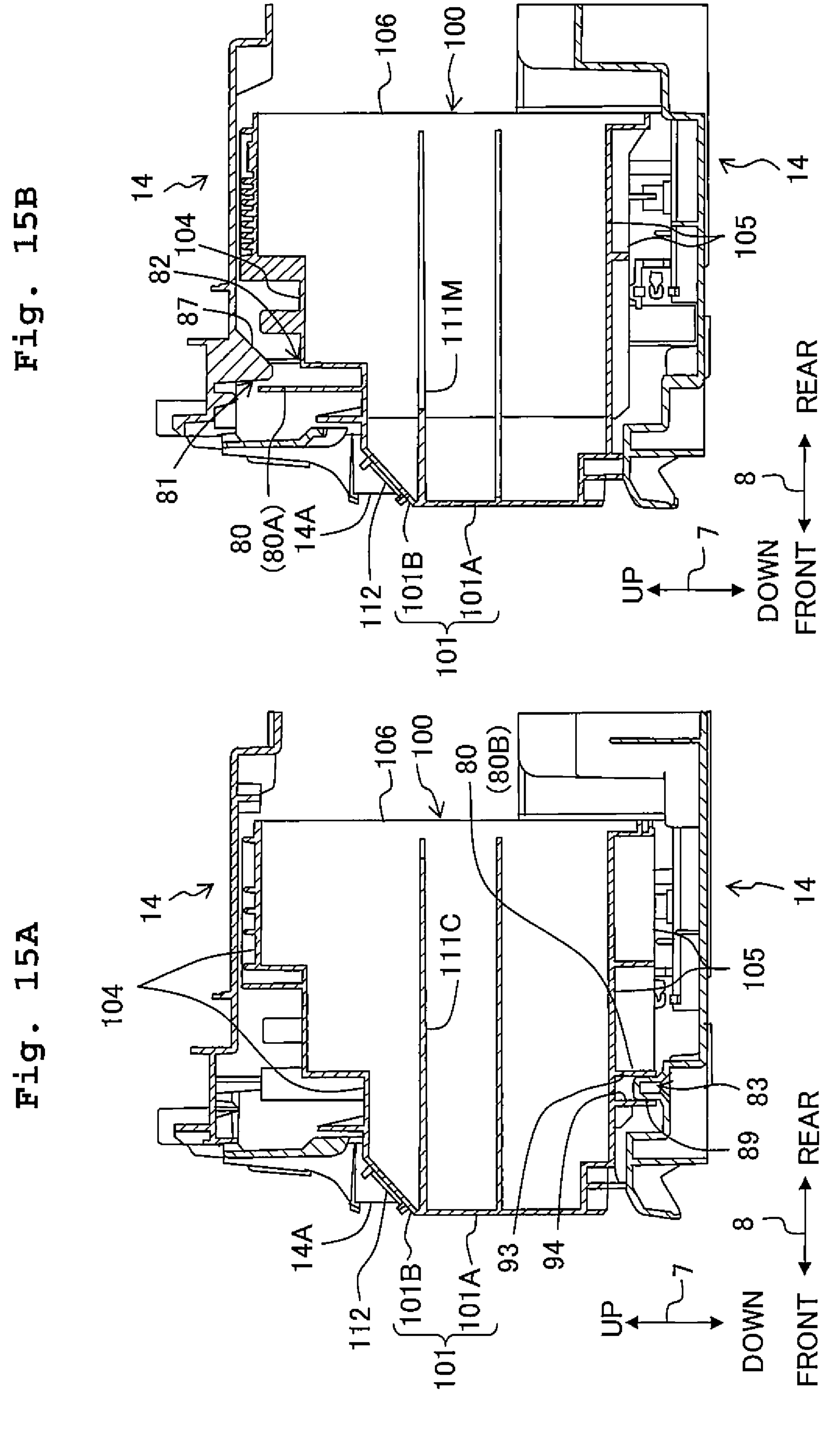
FIG. 15A is a cross-sectional view along a line XVA-XVA of FIG. 13A.
FIG. 15B is a cross-sectional view along a line XVB-XVB of FIG. 13A.
Figure 16:
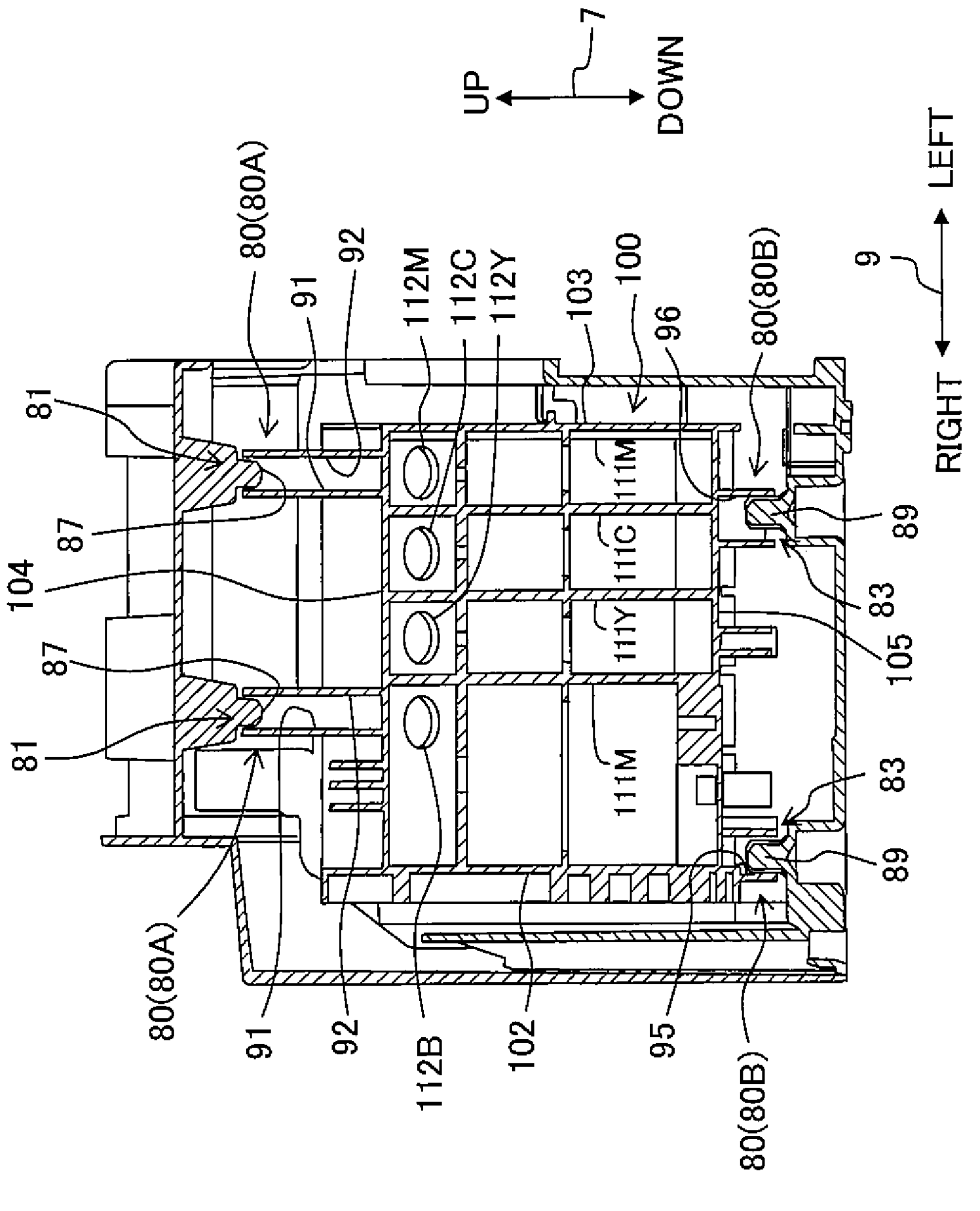
FIG. 16 is a cross-sectional view along a line XVI-XVI of FIG. 13B.

When the multi-function peripheral 10 is in the usable state, the projections 87 are inserted into the positioning sections 80A from the upper side of the positioning sections 80A via the openings 81 (see FIGS. 14B, 15B and 16). Note that the projections 87 can also be inserted into the positioning sections 80A from the rear side of the positioning sections 80A via the openings 82.

Figure 14A:
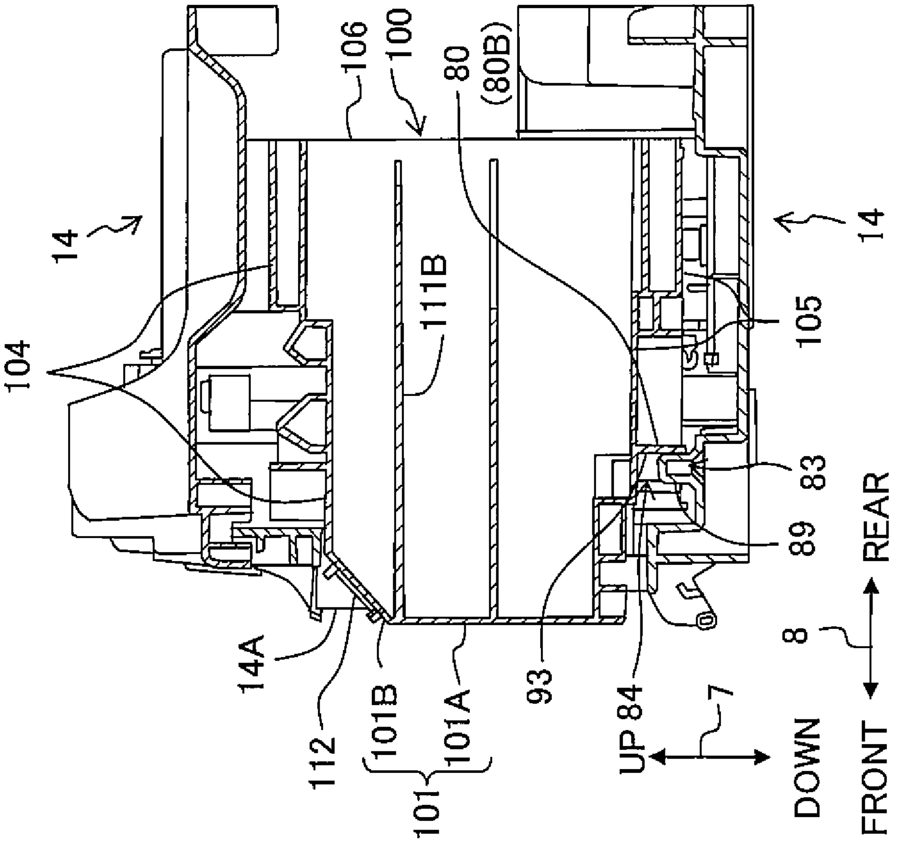
FIG. 14A is a cross-sectional view along a line XIVA-XIVA of FIG. 13A.

When the multi-function peripheral 10 is in the usable state, the projections 89 are inserted into the positioning sections 80B from the lower side of the positioning sections 80B via the openings 83 (see FIGS. 14A, 15A and 16). Note that the projection 89 included in the projections 89, located on the right side can also be inserted into a positioning section 80B, included in the positioning sections 80B, located on the right side and provided with the opening 84, from the front side of the positioning section 80B on the right side via the opening 84 thereof.

In a state that the projections 87 are inserted into the positioning sections 80A, the right and left end portions of each of the projections 87 are brought into contact with a right inner surface 91 and a left inner surface 92, respectively, of one of the positioning sections 80A, as depicted in FIG. 16.

In a state that the projections 89 are inserted into the positioning sections 80B, the rear end portion of the projection 89 included in the two projections 89 and located on the right side is brought into contact with a rear inner surface 93 of the positioning section 80B included in the two positioning sections 80B and located on the right side, as depicted in FIG. 14A. Further, in this state, the front and rear end portions of the projection 89 included in the two projections 89 and located on the left side are brought into contact with a front inner surface 94 and a rear inner surface 93 of the positioning section 80B included in the two positioning sections 80B and located on the left side, as depicted in FIG. 15A. Furthermore, in this state, the right end portion of the projection 89 included in the two projections 89 and located on the right side is brought into contact with a right inner surface 95 of the positioning section 80B included in the two positioning sections 80B and located on the right side, and the left end portion of the projection 89 included in the two projections 89 and located on the left side is brought into contact with a left inner surface 96 of the positioning section 80B included in the two positioning sections 80B and located on the left side, as depicted in FIG. 16.

As described above, the projections 87 and 89 are inserted into the positioning sections 80A and 80B, respectively and are brought into contact with the positioning sections 80A and 80B, respectively, to thereby position the box-shaped body of the ink tank 100 inside the casing 14. The box-shaped body is positioned at a posture at which the front wall 101 can be exposed from the front wall 14A of the casing 14 via the opening 22. Here, the front wall 14A of the casing 14 is a side surface in the casing 14 extending in a direction crossing the horizontal plane. Further, the box-shaped body is positioned at a posture at which the rear end portions, of the respective walls 102, 103, 104, 105, 107, 108 and 109, to which the film 106 are adhered are located further at the inner side in the casing 14 than the front wall 101.

According to the multi-function peripheral 10 of the embodiment, since the front wall 101 of the box-shaped body can be exposed from the front wall 14A of the casing 14 and the box-shaped body is formed of the resin having the light transmitting property, the remaining amount of the ink inside the ink tank 100 can be visually observed through the front wall 101 of the box-shaped body. Further, it is possible to form the box-shaped body having a plurality of spaces divided by the partition walls 107 to 109 as an integrated molded item made of resin. Furthermore, since the ink tank 100 is positioned at the posture wherein the front wall 101 of the box-shaped body can be exposed from the front wall 14A of the casing 14 and the rear end portion(s) of the box-shaped body is (are) located inside the casing 14, the film 106 adhered to the rear end portion(s) of the box-shaped body is less likely to be accessed by an user.

Moreover, according to the multi-function peripheral 10 of the embodiment, the space of the ink tank 100 is divided into the plurality of spaces arranged in the left-right direction 9 by the partition walls 107 to 109, whereas the positioning sections 80 are disposed on the upper and lower walls 104 and 105 of the box-shaped body. Accordingly, the size in the left-right direction 9 of the ink tank 100 can be made smaller than in a case that the positioning sections 80 are disposed on the left and right walls 102 and 103.

Further, according to the multi-function peripheral 10 of the embodiment, the positioning sections 80 are disposed on the upper and lower walls 104 and 105 of the box-shaped body and the ink lead-out channels 117 are disposed on the right wall 102 of the box-shaped body. Accordingly, the positioning sections 80 and the ink lead-out channels 117 have such a layout that the positioning sections 80 and the ink lead-out channels 117 are not arranged on the outer surface of a same wall. Consequently, the positioning sections 80 and the ink lead-out channels 117 do not interfere with each other, and thus a high degree of freedom can be ensured in the layout of the positioning sections 80 and the ink lead-out channels 117.

Furthermore, according to the multi-function peripheral 10 of the embodiment, the plurality of positioning sections 80A disposed on the upper wall 104 and the plurality of positioning sections 80B disposed on the lower wall 105 are arranged at positions each crossing the same horizontal plane 85 orthogonal to the front-rear direction 8. Thus, the box-shaped body can be positioned inside the casing 14 in a well-balanced manner.

Moreover, according to the multi-function peripheral 10 of the embodiment, the projections 87 and 89 are inserted into the positioning sections 80 (80A and 80B) via the openings 81 and 83, respectively, to thereby positioning the box-shaped body inside the casing 14. With this, the box-shaped body can be positioned inside the casing 14 in an ensured manner.

<Modifications>

In the above-described embodiment, the positioning section 80 is provided as the two positioning sections 80 disposed on each of the upper and lower walls 104 and 105. However, the number of the positioning section 80 disposed on each of the upper and lower walls 104 and 105 is not limited to two, and may be one, or may be not less than three. For example, the positioning section 80 may be provided as three positioning sections 80 disposed on each of the upper and lower walls 104 and 105. Further, the number of the positioning section 80 to be provided on each of the walls may be different among the respective walls. For example, two positioning sections 80 may be disposed on the upper wall 104 and four positioning sections 80 may be disposed on the lower wall 105.

Furthermore, in the above-described embodiment, although the positioning sections 80 are disposed on each of the upper and lower surfaces 164 and 165, the positioning section 80 may be disposed on each of the right and left surfaces 162 and 163.

Moreover, the positioning section 80 may be disposed at least on each of the upper and lower surfaces 164 and 165, or on each of the right and left surfaces 162 and 163. For example, the positioning section 80 may be also disposed on the right surface 162, in addition to the upper and lower surfaces 164 and 165.

Further, in the above-described embodiment, each of the plurality of ink outflow channels 114 extends toward the right wall 102, and the plurality of ink lead-out channels 117 are arranged on the right surface 162. It is allowable, however, that the ink outflow channels 114 may extend toward a wall or surface other than the right wall 102. Further, the ink lead-out channels 117 may be arranged on a surface or wall other than the right surface 162. For example, each of the ink outflow channels 114 may extend toward the left wall 103, and the ink lead-out channels 117 may be arranged on the left surface 163.

Furthermore, in the embodiment, the opening 82 is formed on the rear portion of each of the positioning sections 80A, and the opening 84 is formed in the front portion of the positioning section 80B arranged on the right side among the two positioning sections 80B. However, it is not necessarily indispensable that the opening 82 and the opening 84 are formed.

Moreover, in the embodiment, the opening 22 is formed on the right portion of the front wall 14A of the casing 14, and the ink tank 100 is arranged behind the opening 22. It is allowable, however, that the opening 22 is formed on a left portion of the front wall 14A of the casing 14, and that the ink tank 100 is arranged behind the opening 22 formed in the left portion. Further, it is also allowable that the opening 22 is formed on the right or left wall, instead of being formed on the front wall 14A of the casing 14, and that the inlets 112 of the ink tank 100 can be accessed from the right or left side.

Further, in the embodiment, the ink is explained as an example of the liquid. However, the present teaching is not limited to this. Namely, instead of being an ink, the liquid may be a pre-treatment liquid which is to be discharged to a recording medium before the ink is discharged during the printing, or the liquid may be water, etc. which is to be sprayed in the vicinity of the nozzles 40 of the recording head 39 for the purpose of preventing drying of the nozzles 40 of the recording head 39, and the like.

What is claimed is:

1. An ink-jet printer, comprising:

a casing having an opening;

a recording head arranged in the casing and configured to jet ink;

a tank arranged in the casing and configured to store ink which is to be supplied to the recording head, wherein the tank includes:

a front wall having a light-transmitting property;

a lower wall;

an ink chamber defined by the front wall and the lower wall;

an inlet communicating with the ink chamber;

a pair of films forming at least a part of a pair of lateral walls, respectively, the pair of lateral walls being different from the front wall; and a positioning section disposed on the lower wall, wherein the positioning section is brought into contact with the casing, and thereby the tank is positioned at a posture at which at least a portion of the front wall is exposed from the opening of the casing.

2. The ink-jet printer according to claim 1, wherein the pair of films has a weaker strength than the front wall and the lower wall.

3. The ink-jet printer according to claim 1, wherein the lower wall separates the ink chamber from the positioning section such that the ink chamber is not in liquid communication with the positioning section.

4. The ink-jet printer according to claim 1, wherein in a case that the tank is positioned in the casing, the lower wall is located blow the recording head.

5. The ink-jet printer according to claim 4, further comprising a discharge tray on which a printed object is discharged, the printed object being an object on which the ink has been jetted by the recording head, wherein in a case that the tank is positioned in the casing, the lower wall is located below the discharge tray.

6. The ink-jet printer according to claim 1, wherein the casing includes a protrusion configured to engage with the positioning section.

7. The ink-jet printer according to claim 6, wherein the protrusion is located at a bottom surface of the casing.

8. The ink-jet printer according to claim 1, wherein the positioning section disposed on the lower wall extends downwardly from a lower surface of the lower wall.

9. The ink-jet printer according to claim 8, wherein the positioning section has a hollow-pillar shape having an internal space.

10. The ink-jet printer according to claim 9, wherein the positioning section includes an extended end port having an opening that is continued to the internal space and that is opened upward toward the internal space.

11. The ink-jet printer according to claim 8, wherein the casing includes a protrusion configured to engage with the positioning section, and wherein the protrusion protrudes upwardly from a bottom surface of the casing.

12. The ink-jet printer according to claim 11, wherein the protrusion is configured to engage with the positioning section from below.

13. The ink-jet printer according to claim 11, wherein the protrusion includes a contact portion configured to contact with the positioning section in a front-rear direction, and wherein in a case that the contact portion contacts with the positioning section, the tank is positioned in the casing in the front-rear direction.

14. The ink-jet printer according to claim 11, wherein in a case that the protrusion is engaged with the positioning section, an extending end of the protrusion is located to be away from the lower wall.

15. The ink-jet printer according to claim 1, wherein one of the pair of films extends in a part of one of the pair of the lateral walls.

16. The ink-jet printer according to claim 15, wherein the one of the pair of films extends to a lower part of the one of the pair of the lateral walls.

17. The ink-jet printer according to claim 1, wherein the casing has an object discharge opening, the object discharge opening and the opening are provided at the same side of the casing.

18. The ink-jet printer according to claim 17, wherein the object discharge opening and the opening open towards a same direction.

19. The ink-jet printer according to claim 1, wherein the tank includes an atmosphere communication channel, and wherein the atmosphere communication channel is communicated with the outside of the tank via a through hole.

20. The ink-jet printer according to claim 15, wherein the one of the pair of the lateral walls includes an in lead-out channel defined by the one of the pair of films.

21. The ink-jet printer according to claim 15, wherein the ink-jet printer includes a plurality of tanks arranged in an array direction, wherein the plurality of tanks are positioned by the positioning section such that the plurality of tanks are arranged near one of a certain pair of lateral walls of the casing, the certain pair of lateral walls of the casing faces with each other in an orthogonal direction orthogonal to the array direction, wherein the one of the pair of the lateral walls is a wall located nearest to the one of the certain pair of lateral walls of the casing.

22. The ink-jet printer according to claim 21, further comprising an atmosphere communication channel including a labyrinth provided between the ink chamber and a through hole, and the one of the pair of the lateral walls is different from a wall in which the labyrinth is formed.

23. The ink-jet printer according to claim 19, wherein the atmosphere communication channel includes a labyrinth provided between the ink chamber and the through hole, wherein the ink-jet printer includes a plurality of tanks arranged in an array direction, wherein the plurality of tanks are positioned by the positioning section such that the plurality of tanks are arranged near one of a certain pair of lateral walls of the casing, the certain pair of lateral walls of the casing faces with each other in an orthogonal direction orthogonal to the array direction, and wherein the one of the pair of the lateral walls is a wall located nearest to the one of the certain pair of lateral walls of the casing.

24. The ink-jet printer according to claim 23, wherein a lateral wall at least a part of which is formed by the one of the pair of films is different from a wall in which the labyrinth is formed.

* * * * *